(12) United States Patent
De Ayguavives et al.

(10) Patent No.: US 11,561,416 B2
(45) Date of Patent: Jan. 24, 2023

(54) OPHTHALMIC TINTED GLASS

(71) Applicant: ESSILOR INTERNATIONAL, Charenton-le-Pont (FR)

(72) Inventors: Francisco De Ayguavives, Charenton-le-Pont (FR); Xiaohong Zhang, Charenton-le-Pont (FR); William Trottier-Lapointe, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 239 days.

(21) Appl. No.: 16/969,484

(22) PCT Filed: Feb. 15, 2019

(86) PCT No.: PCT/EP2019/053866
§ 371 (c)(1),
(2) Date: Aug. 12, 2020

(87) PCT Pub. No.: WO2019/158717
PCT Pub. Date: Aug. 22, 2019

(65) Prior Publication Data
US 2020/0400974 A1 Dec. 24, 2020

(30) Foreign Application Priority Data
Feb. 15, 2018 (EP) ..................................... 18305153

(51) Int. Cl.
*G02C 7/10* (2006.01)
(52) U.S. Cl.
CPC ............. *G02C 7/104* (2013.01); *G02C 7/107* (2013.01); *G02C 7/108* (2013.01); *G02C 2202/16* (2013.01)

(58) Field of Classification Search
CPC ......... G02C 7/104; G02C 7/107; G02C 7/108
(Continued)

(56) References Cited

U.S. PATENT DOCUMENTS 3,826,751 A  7/1974 Laliberte
5,083,858 A *  1/1992 Girerd .................... G02C 7/104
                                                              351/44
(Continued)

FOREIGN PATENT DOCUMENTS

DE   102007007777   6/2008
EP       3088921   11/2016
(Continued)

OTHER PUBLICATIONS

International Search Report and Written Opinion Issued in Corresponding PCT Patent Application No. PCT/EP2019/053866, dated Mar. 18, 2019.

*Primary Examiner* — James R Greece
(74) *Attorney, Agent, or Firm* — Norton Rose Fulbright US LLP

(57) ABSTRACT

An ophthalmic tinted glass (10) comprises a substrate-forming base eyeglass (1), a first layered structure (2) which covers a convex face (Cx) of the base eyeglass, and optionally a second layered structure (3) which covers a concave face (Cc) of the base eyeglass. The first layered structure has a function of selective reflection increase, and the second layered structure is antireflective. Such ophthalmic tinted glass produces solar protection while having a mean transmittance value in a wavelength range from 460 nm to 10 nm, or 465 nm to 495 nm, which is high enough for avoiding biological, hormonal and behavioural disorders for a wearer of the tinted glass.

21 Claims, 13 Drawing Sheets

(58) Field of Classification Search
USPC .................................................. 351/159.65
See application file for complete search history.

(56) References Cited

U.S. PATENT DOCUMENTS

| 5,592,245 | A | 1/1997 | Moore et al. |
| 2014/0340630 | A1 | 11/2014 | Pugh et al. |
| 2015/0309335 | A1 | 10/2015 | Li et al. |
| 2017/0242273 | A1* | 8/2017 | Iwasaki .................. G02C 7/10 |

FOREIGN PATENT DOCUMENTS

| EP | 3112926 A1 * | 1/2017 | ............. G02C 7/104 |
| EP | 3528037 A1 * | 8/2019 | ............... G02C 7/02 |
| WO | WO 2013/177676 | 12/2013 | |

* cited by examiner

OPHTHALMIC TINTED GLASS

CROSS-REFERENCE TO RELATED APPLICATIONS

This application is a national phase application under 35 U.S.C. § 371 of International Application No. PCT/EP2019/053866 filed 15 Feb. 2019, which claims priority to European Patent Application No. 18305153.1 filed 15 Feb. 2018. The entire contents of each of the above-referenced disclosures is specifically incorporated by reference herein without disclaimer.

The invention relates to an ophthalmic tinted glass and a solar-protection eyewear.

BACKGROUND OF THE INVENTION

Ophthalmic tinted glasses are known for long time for protecting the eyes against excessive solar light intensity. To this purpose, a tinted glass is designed for absorbing and/or reflecting solar light so as to reduce light intensity to an amount which provides safety and comfortable vision to the wearer. Light which is involved in vision for a human being, called visible light, corresponds to the wavelength range from 380 nm (nanometer) to 780 nm, called visible wavelength range.

But it has been discovered more recently that light within the wavelength range from 460 nm to 510 nm is involved in maintaining circadian rhythms for the wearer. This range corresponds to medium-blue light. By significantly reducing retinal exposure to light which pertains to this wavelength range, tinted glasses may progressively have detrimental effects on the biological, hormonal and behavioural functions of the wearer. Such detrimental effects may appear after daily repeated and abusively prolonged wearing of the tinted glasses, and sleep troubles, seasonal affective disorders and mood disorders may result in long term. These effects are commonly described as chronobiological because of their consequences on the circadian rhythms of the wearer.

In addition, by significantly reducing the intensity of visible light which enters into the eyes, the tinted glasses cause the pupil diameter to increase, which affects visual acuity. In particular, the depth of field is decreased and the optical aberrations are more important. Also the increase in the pupil diameter leads to higher energetic exposure of the retina to non-filtered light wavelengths, in particular in case of non-filtered blue-violet wavelengths which are deemed to be noxious. Blue-violet wavelengths correspond to values between 380 nm and 450 nm.

It is known to prepare tinted lenses with dyes incorporated in the substrate of the lens or in coating at the surface of the substrate of the lens. A proper selection of dyes yield a higher transmittance in the wavelength range from 460 nm to 510 nm as compared to the luminous transmittance through the lens. However, dyes are usually not very selective and it is difficult to achieve a large difference of transmission in the two ranges of wavelength of interest.

From this situation, one object of the invention is to provide ophthalmic tinted glasses which produce protection against excessive light intensity but in which transmittance within the wavelength range from 460 nm to 510 nm is enriched.

Another object of the invention is to allow production of such tinted glasses with enriched transmittance within the wavelength range 460 nm-510 nm, from base tinted glasses.

An additional object of the invention is to provide such tinted glasses which produce good protection against blue-violet light.

SUMMARY OF THE INVENTION

For meeting at one of these objects or others, a first aspect of the invention proposes an ophthalmic tinted glass which comprises:

a substrate-forming base eyeglass, comprised of a self-supporting portion of a light-transmitting material intermediate between a convex face and a concave face, and a first layered structure which covers the convex face of the base eyeglass, and which is adapted for increasing a reflection effective for light impinging from outside of the tinted glass onto the convex face covered by the first layered structure, when compared to a reference reflection effective for light impinging also from outside onto the convex face but without the first layered structure, the reflection increase being effective for at least one light wavelength higher than 520 nm, and preferably less than 780 nm.

According to the invention, the base eyeglass and the first layered structure are such that a difference equal to a mean transmittance value of the tinted glass over a wavelength range from 460 nm to 510 nm minus a visual transmission value of the tinted glass is higher than 14%, preferably higher than or equal to 20%. Put another way, $T_{mB}-T_v>14\%$, where $T_{mB}$ is the mean transmittance value of the tinted glass over the wavelength range from 460 nm to 510 nm, and $T_v$ is the visual transmission value of the tinted glass as defined in standard ISO 8980-3:2013, for taking into account the spectral sensibility to light of the retina cells, and using the illuminant D65 as defined by CIE standard ISO 10526:1999/CIE S005/E-1998. In the frame of the present invention, the mean transmittance value over the wavelength range from 460 nm to 510 nm denotes the calculation result of $\int_{460\,nm}^{510\,nm} T(\lambda)\cdot d\lambda/50$, denoted $T_{mB}$, where 50 is the length in nanometers of the wavelength range 460 nm-510 nm, corresponding to medium-blue light, $\lambda$ denotes the wavelength in nanometers and $T(\lambda)$ denotes the spectral transmittance value at wavelength $\lambda$.

In this disclosure, the term "visual transmission value" has the same meaning than the term "luminous transmittance" Tv (as defined in ISO 13666).

Possibly, in the whole description and appended claims, the wavelength range 460 nm-510 nm may be replaced with range 465 nm-495 nm while maintaining any threshold value unchanged. In such conditions, the mean transmittance value $T_{mB}$ to be considered is $\int_{465\,nm}^{495\,nm} T(\lambda)\cdot d\lambda/30$, where 30 is the length in nanometers of the wavelength range 465 nm-495 nm.

In this way, the proportion of the medium-blue light relative to the total amount of light which is effective for vision is increased by the first layered structure. But simultaneously, by selectively increasing light reflection, the first layered structure also produces a solar protection effect, with respect to the base eyeglass devoid of the first layered structure, since it reduces the total amount of visible light which enters into the wearer's eye.

The base eyeglass may be a clear eyeglass, for example with visual transmission value higher than 90%, or higher than 95%, when measured in daylight conditions or using illuminant D65.

Alternatively, the material of base eyeglass may be light-absorbing, so that the base eyeglass produces a first solar protection effect. Then the first layered structure provides an additional solar protection so that the invention ophthalmic tinted glass has an overall solar protection efficiency which is improved with respect to that of the bare base eyeglass. And also in such case of light-absorbing base eyeglass, the first layered structure increases the relative proportion of medium-blue light with respect to the total light which is allowed by the base eyeglass to enter into the wearer's eye.

In particular, the base eyeglass may have a visual transmission value which is higher than 18% when devoid of the first layered structure, and the first layered structure may be such that the visual transmission value of the tinted glass is less than or equal to 18%. In this way, the invention allows transforming an initial ophthalmic tinted glass which is formed by the bare base eyeglass, and which pertains to class 2 as defined by the standard ISO 12312-1, into a final ophthalmic tinted glass which pertains to class 3.

Advantageously, the base eyeglass and the first layered structure may be such that the mean transmittance value of the tinted glass over the wavelength range from 460 nm to 510 nm, or from 465 nm to 495 nm, is higher than 30%, preferably higher than 40%, more preferably higher than or equal to 48%. Then, enough medium-blue light intensity enters into the wearer's eye to ensure that biological, hormonal and behavioural functions are not altered, and related circadian rhythms are maintained.

Generally for the invention, the base eyeglass may advantageously be such that its spectral transmittance when devoid of the first layered structure is less than 30%, preferably less than 20%, across the wavelength range from 380 nm to 450 nm. This means that the base eyeglass may be light-absorbing at least for visible light wavelengths below 450 nm. Thus, the base eyeglass provides protection against blue-violet light, and also the invention tinted glass.

The base eyeglass may also be such that its spectral transmittance when devoid of the first layered structure is less than 25% across a wavelength range from 540 nm to 630 nm. This ensures that the invention tinted glass produces an efficient protection against dazzling for the wearer, because the maximum of the spectral sensibility of the human eye to light is close to 570 nm.

Alternatively or in combination, the base eyeglass may be such that its visual transmission value is less than 25%, again when devoid of the first layered structure.

The base eyeglass material may be comprised of a transparent matrix with dyes and absorbers which are distributed therein. At least one of the dyes may have a light-absorption peak in the wavelength range from 380 nm to 450 nm, and at least two of the absorbers may have respective light-absorption peaks in another wavelength range from 520 nm to 660 nm.

Generally for the invention, the spectral reflectance of the ophthalmic tinted glass for light impinging on the convex optical face with incidence value of 15°, may have a value of more than 30% for at least one first wavelength comprised between 520 nm and 660 nm, and another value of less than 20% for at least one second wavelength comprised between 460 nm and 510 nm. Thus, the first layered structure is less light-reflecting at the second wavelength in the medium-blue range with chronobiological effect, than for longer wavelengths corresponding to green, yellow or red colors.

Again generally for the invention, the ophthalmic tinted glass may further comprise:

a second layered structure which covers the concave face of the base eyeglass, and which is adapted for decreasing a visual reflection value effective for light impinging from outside of the tinted glass onto the concave face covered by the second layered structure, when compared to a visual reference reflection effective for light impinging also from outside onto the concave face of the base eyeglass but when devoid of the second layered structure.

Such antireflection coating on the concave face of the tinted glass, as formed by the second layered structure, avoids that reflected light from behind the wearer's head, obliquely on each side, interferes with vision through the tinted glass. Preferably, the second layered structure may be such that the visual reflection value effective for light impinging from outside of the tinted glass onto the concave face of the ophthalmic tinted glass covered by the second layered structure is less than 3%, preferably less than or equal to 2.5%, for incidence value of 35° (degree). The visual reflection values considered meet again the ISO standard indicated above for taking into account the spectral sensibility to light of the retina cells, using the illuminant D65.

In possible embodiments of the invention, the first layered structure may be a stack of eleven layers alternatively of zirconia and silica, starting and ending with two of the zirconia layers. The zirconia layers may have respective thicknesses between 50 nm and 73 nm, and the silica layers may have respective thicknesses between 80 nm and 125 nm.

In other possible embodiments of the invention, the first layered structure may be an ordered stack which comprises, from the convex face of the base eyeglass:

an underlayer with a refractive index of about 1.5 for wavelength value of 633 nm, and with a thickness of between 65 nm and 80 nm, three layers alternatively of zirconia and silica, starting with a first zirconia layer having a thickness of between 90 nm and 100 nm, then a first silica layer having a thickness of between 59 nm and 65 nm, and then a second zirconia layer having a thickness of between 74 nm and 82 nm, one indium-tin oxide layer having a thickness of between 5 nm and 8 nm, and a second silica layer having a thickness of between 28 nm and 32 nm.

Simultaneously, these other invention embodiments may comprise a second layered structure, which is another ordered stack comprising, from the concave face of the base eyeglass:

another underlayer with a refractive index of about 1.5 for wavelength value of 633 nm, and with a thickness of between 143 nm and 158 nm, another three layers alternatively of zirconia and silica, starting with another first zirconia layer having a thickness of between 18 nm and 20 nm, then another first silica layer having a thickness of between 32 nm and 36 nm, and then another second zirconia layer having a thickness of between 70 nm and 78 nm, another indium-tin oxide layer having a thickness of between 5 nm and 8 nm, and another second silica layer having a thickness of between 95 nm and 104 nm.

In possible embodiments of the invention, the transmittance over a wavelength range from 465 nm to 495 nm is higher than 60%.

In particular, the transmittance over a wavelength range from 465 nm to 495 nm is higher than 75%.

Advantageously, the base eyeglass is a clear eyeglass.

Finally, a second aspect of the invention proposes a solar-protection eyewear, which comprises a frame and two ophthalmic tinted glasses mounted into the frame, each ophthalmic tinted glass being in accordance with the first invention aspect.

These and other features of the invention will be now described with reference to the appended figures, which relate to preferred but not-limiting embodiments of the invention.

BRIEF DESCRIPTION OF THE DRAWINGS

For clarity sake, element sizes which appear in these figures do not correspond to actual dimensions or dimension ratios. Also, same reference labels which are indicated in some of these figures and in tables provided below denote identical elements of elements with identical function.

DETAILED DESCRIPTION OF THE INVENTION

In this disclosure, layers noted as Zi are zirconia ($ZrO_2$) layers with refractive index value of about 1.997 for the wavelength of 550 nm; layers noted as UL or Qi are silica ($SiO_2$) layers with refractive index value of about 1.473 for the same wavelength of 550 nm; layers noted as Ti are titanium oxide ($TiO_2$) layers with refractive index value of about 2.375 for the same wavelength of 550 nm and layers notes as Cr are chromium layers with refractive index value of about 3.12 and an extinction coefficient of about 4.4 for the same wavelength of 550 nm.

In all tables showing configurations of layered structures, values displayed are the physical thicknesses of each individual layer, expressed in nanometers, and provided that the actual thickness values are within +/−5% of the values displayed.

Unless otherwise specified, optical properties (reflection and transmittance) are measured for an incident angle of light of 15°.

Figure 1A:
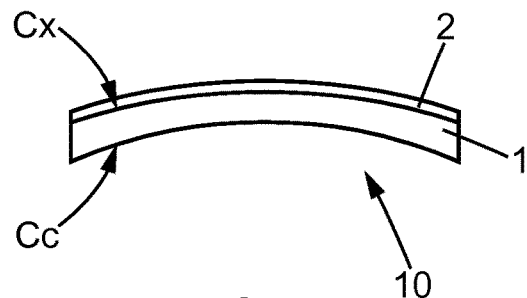
FIGS. 1a and 1b are side views of two ophthalmic tinted glasses according to the invention.

FIG. 1a shows a first possible configuration for an ophthalmic tinted glass 10 in accordance with the invention. It comprises a base eyeglass 1 which is self-supporting and has opposite optical faces Cx and Cc. The optical face Cx is convex and intended to be oriented towards a scene to be viewed when the tinted glass 10 is fitted within a spectacle frame and worn by a wearer. The optical face Cc is concave and intended to face an eye of the wearer. Both optical faces Cx and Cc may be such that the base eyeglass 1 does not produce any ametropia correction, namely it is of plano type, or may be such that the base eyeglass 1 produces an ametropia correction. In such latter case, the base eyeglass 1 may be of single vision type or a progressive addition lens.

Generally for the invention, base eyeglasses may be of any substrate, including those known under the acronyms or common designations ORMA™, MR7, MR8, 1.67, Physiotint™ 1.67, Trivex™, etc. Photochromic base eyeglasses, polarizing eyeglasses and any tinted lens may also be used. Substrates are usually coated with hard coats to improve mechanical properties (weathering resistance, anti scratch, anti abrasion, impact resistance). For the invention, the substrate may be coated or uncoated. The base eyeglass 1 is covered on its optical convex face Cx by a layered structure 2. The layered structure 2 is based on thin-film technology so that the base eyeglass 1 forms a substrate for the layered structure 2. Preferably, the layered structure 2 is multi-layered, and any coating deposition process or combination of several coating deposition processes may be used for producing the layered structure 2, including physical vapour deposition (PVD), e.g. beam evaporation, thermal evaporation, sputtering, and also including chemical vapour deposition (CVD), atomic layer deposition (ALD), sol-gel, varnish deposition, etc. The structure 2 has been called first layered structure in the general part of this description.

Figure 1B:
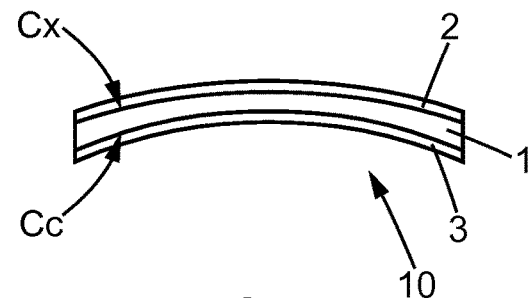

Optionally, according to a second possible configuration for an ophthalmic tinted glass 10 in accordance with the invention, the base eyeglass 1 may also be covered on its optical concave face Cc with a layered structure 3, as shown in FIG. 1b. In such case, the layered structure 3 is based on thin-film technology too, and may be multi-layered and deposited using the same deposition processes as recited above. The structure 3 has been called second layered structure in the general part of this description.

The base eyeglass 1 may be a clear eyeglass, corresponding to class 0 or class 1 for tinted glasses as defined in standard ISO 12312-1. For example it may be an Orma™ eyeglass as supplied by Essilor, or a polycarbonate eyeglass. In such cases, the solar protection function of the ophthalmic tinted glass 10 is provided by the layered structure 2.

Alternatively, the base eyeglass 1 may be of a light-absorbing material, still light-transmitting but with reduced transmission value, so that it produces per se a first contribution to the solar protection function of the ophthalmic tinted glass 10. In such case, the layered structure 2 produces an additional solar protection contribution, so that the solar protection efficiency of the ophthalmic tinted glass 10 results from both contributions of the base eyeglass 1 and the layered structure 2. For such alternative embodiments, the base eyeglass 1 may be based on Trivex™ matrix as supplied by PPG industries, which is well known and based on polyurethane polymer. The Trivex™ matrix is clear material per se, but dyes and absorbers can be incorporated therein for forming a tinted base eyeglass 1. For example, Table 1 below indicates possible dye- and absorber concentrations which correspond to the spectral transmittance curve represented in FIG. 2, for a 2 mm (millimeter) thick plano base eyeglass 1. The dye- and absorber concentrations are expressed in mg (milligram) of each dye or absorber for 100 g of the resulting blend of Trivex™ with the dyes and absorbers. Commercial suppliers are also indicated between parentheses.

TABLE 1

| dyes | absorbers | concentrations |
|---|---|---|
| Macrolex Green 5B (Lanxess AG)) | | 4 |
| Estofil Blue RR (Sandoz Ltd) | | 5 |

TABLE 1-continued

| dyes | absorbers | concentrations |
|---|---|---|
| Macrolex Yellow G (Lanxess AG) | | 1.8 |
| | Exciton ABS584L (Exciton) | 1 |
| Macrolex Violet 3R (Lanxess AG) | | 1 |
| | Exciton ABS 526 (Exciton) | 1.5 |
| | Yamada FDB002 (Yamada Chemical Co., Ltd.) | 6 |
| | Gentex A102 (Gentex) | 0.5 |

Figure 2:
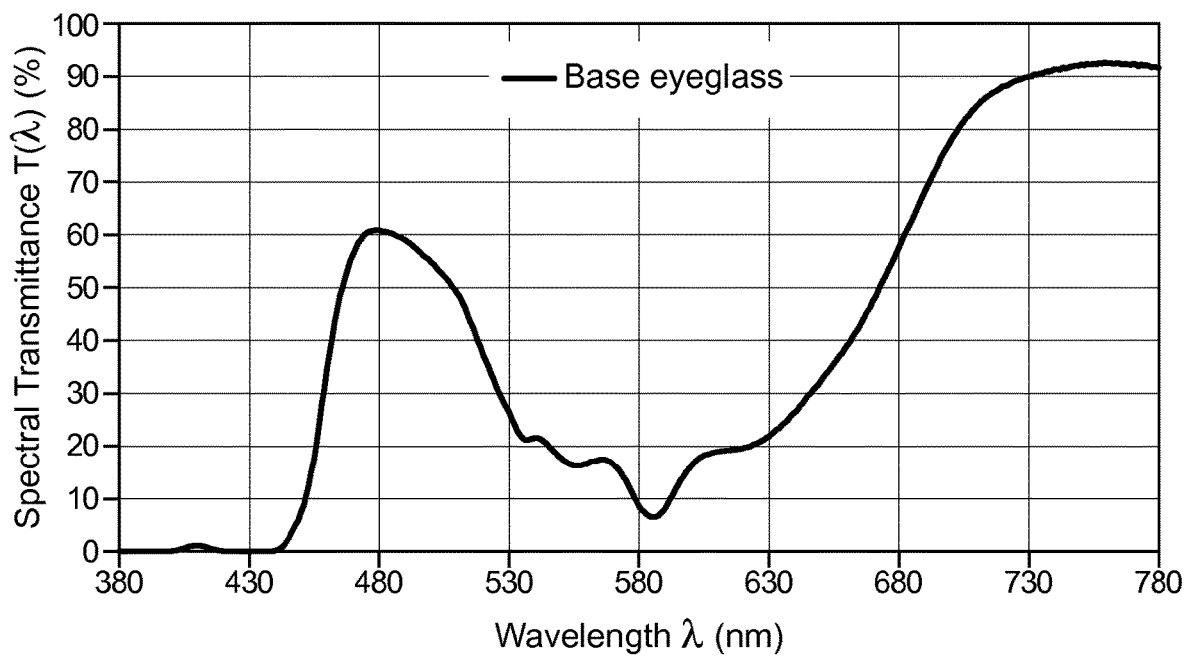
FIG. 2 is a diagram displaying a spectral transmittance curve for a base eyeglass which may be used for an ophthalmic tinted glass according to the invention.

The dyes indicated are mainly responsible for the shape of the eyeglass transmittance profile for wavelength values between 380 nm and 450 nm, whereas the absorbers are mainly responsible for the shape of the eyeglass transmittance profile for wavelength values between 520 nm and 680 nm. In the diagram of FIG. 2, the horizontal axis indicates the wavelength $\lambda$ in the visible range, i.e. from 380 nm (nanometer) to 780 nm, and the vertical axis indicates the spectral transmittance values $T(\lambda)$ for light impinging perpendicular to the convex face Cx. As this appears from the transmittance curve, such base eyeglass 1 produces light absorption for wavelength values between 380 nm and 450 nm, and also between 520 nm and 680 nm. The absorption between 380 nm and 450 nm is beneficial for protecting the wearer's eye against harmful blue-violet radiation, and that between 520 nm and 680 nm is efficient for producing the solar protection function. Actually, as shown in the diagram of FIG. 2, the spectral transmittance $T(\lambda)$ is much less than 20% in the range 380 nm-450 nm, and less than 25% in the range 540 nm-630 nm. However, the transmission window between 460 nm and 510 nm allows enriching the total light which is transmitted for vision to the wearer's eye with medium-blue light beneficial for the chronobiological effects. The visual transmission value $T_v$, as defined by the standard ISO 8980-3:2013 with illuminant D65, is then 23.1%, corresponding to class 2 for tinted glasses as defined in standard ISO 12312-1. The rear side visual reflection value $R_v$, for light impinging on the concave face Cc, is about 5% at incidence value of 35°, and the mean transmittance value over the medium-blue range from 460 nm to 510 nm, $T_{mB} = \int_{460\ nm}^{510\ nm} T(\lambda) \cdot d\lambda / 50$, is 53.1%. The rear side visual reflection value $R_v$ which is considered here takes into account the absorption of the substrate.

Table 2 below displays the configurations of five ophthalmic tinted glasses 10, labelled D1 to D5, with their respective values for the visual transmission $T_v$, the visual reflection $R_v$ of the concave face Cc for incidence value of 35° (degree), and the medium-blue mean transmittance value $T_{mB}$ as defined by the integral equation above. For these tinted glasses D1 to D5, the base eyeglass 1 is that of FIG. 2 and Table 1, denoted tinted as indicated in the column labelled 1. Refractive index of Trivex™ lens substrate is 1.53.

TABLE 2

| 10 | 1 | face | Z1 | Q1 | Z2 | Q2 | Z3 | $T_v$(%) | $R_v$(%) | $T_{mB}$(%) |
|---|---|---|---|---|---|---|---|---|---|---|
| D1 | tinted | Cx | 89.0 | 108.3 | 56.8 | 34.8 | none | 18.1 | 6.3 | 49.4 |
| | | Cc | | | air | | | | | |
| D2 | tinted | Cx | 91.3 | 113.6 | 60.1 | 12.7 | none | 18.1 | 3.0 | 49.2 |
| | | Cc | 23.0 | 26.6 | 77.2 | 94.4 | none | | | |

TABLE 2-continued

| 10 | 1 | face | Z1 | Q1 | Z2 | Q2 | Z3 | $T_v$(%) | $R_v$(%) | $T_{mB}$(%) |
|---|---|---|---|---|---|---|---|---|---|---|
| D3 | tinted | Cx | 87.8 | 115.0 | 58.1 | 99.7 | 103.2 | 18.0 | 6.4 | 56.0 |
|    |        | Cc |      |       |      |      | air   |      |     |      |
| D4 | tinted | Cx | 83.3 | 57.6  | 78.8 | 71.5 | 124.5 | 18.6 | 2.5 | 49.7 |
|    |        | Cc | 19.6 | 38.1  | 86.4 | 100.6| none  |      |     |      |
| D5 | tinted | Cx | 222.4| 91.3  | 220.4| 21.6 | none  | 17.9 | 17.5| 51.7 |
|    |        | Cc | 83.0 | 66.5  | 46.0 | 99.7 | none  |      |     |      |

In this table, Z1, Q1, Z2, Q2 and Z3 denote the successive layers of the layered structures 2 (resp. 3) borne by the optical faces Cx (resp. Cc) of the base eyeglasses 1, when recited from the base eyeglass 1 to the air interface in front of (resp. behind) the tinted glass 10. Z1, Z2 and Z3 are zirconia ($ZrO_2$) layers with refractive index value of about 2.00 for the wavelength value of 633 nm, and Q1 and Q2 are silica ($SiO_2$) layers with refractive index value of about 1.47 for the same wavelength value of 633 nm. The values displayed in the layer columns are the physical thicknesses of the individual layers, expressed in nanometers, and provided that the actual thickness values are within +/−5% of the values displayed. The layered structures 2 displayed in the Cx-lines are of selective mirror type, because of being reflection-enhancing for some wavelength values above 520 nm when comparing the base eyeglass 1 with and without the layered structure 2. The mention "air" in two of the Cc-lines indicates that the concave optical faces Cc of the tinted glasses D1 and D3 do not have any layered structure 3, and the layered structures 3 displayed in the Cc-lines for the tinted glasses D2 and D4 are of antireflection type. That for the tinted glass D5 is reflection-increasing. $T_v$-value being less than or equal to 18% means that the tinted glass 10 is of class 3. Thus, an appropriate layered structure 2 and a layered structure 3 when implemented can transform a base eyeglass 1 which pertains to class 2 of tinted glasses into a tinted glass 10 of class 3. $R_v$-value being less than or equal to 2.5% means that the tinted glass 10 is antireflective on its rear side.

Table 3 below displays the values for another tinted glass 10 according to the invention, which is labelled D6 and implements a base eyeglass 1 corresponding to FIG. 2 and Table 1, with thickness of 2 mm for this base eyeglass 1. The layered structure 2 on the convex face Cx is of selective mirror type again, and the layered structure 3 on the concave face Cc is antireflective.

TABLE 3 ophthalmic tinted glass D6

| face | UL | Z1 | Q1 | Z2 | ITO | Q2 | $T_v$(%) | $R_v$(%) | $T_{mB}$(%) |
|---|---|---|---|---|---|---|---|---|---|
| Cx | 71.8  | 95.2 | 62.1 | 77.8 | 6.5 | 30.1 | 18.6 | 2.5 | 49.7 |
| Cc | 150.0 | 18.9 | 34.1 | 74.1 | 6.5 | 99.5 |      |     |      |

Figure 3A:
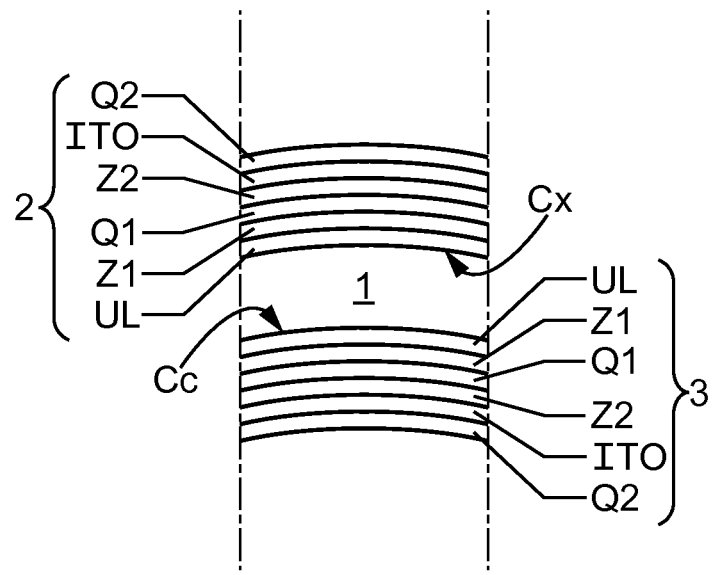
FIGS. 3a and 3b are parts of cross-sectional views for two ophthalmic tinted glasses according to the invention.

In Table 3, UL denotes underlayer with refractive index value of about 1.50 at wavelength of 633 nm, and ITO denotes layers of indium-tin (In—Sn) oxide which are intermediate between layers Z2 and Q2. For example, the underlayers UL may be varnish layers which provide protection against impacts and scratches. FIG. 3a shows the layers of such tinted glass D6.

Table 4 below displays the values for another tinted glass 10 according to the invention, which is labelled D7 and implements an Orma™ base eyeglass 1 with thickness of 2 mm and refractive index of 1.5. The layered structure 2 on the convex face Cx is comprised of eleven layers alternatively of zirconia (Z1-Z6) and silica (Q1-Q5), but no layered structure 3 is on the concave face Cc.

TABLE 4 ophthalmic tinted glass D7

| Z1 | Q1 | Z2 | Q2 | Z3 | Q3 | Z4 | Q4 | Z5 | Q5 | Z6 |
|---|---|---|---|---|---|---|---|---|---|---|
| 68.8 | 89.4 | 63.0 | 93.0 | 65.6 | 115.9 | 60.1 | 98.9 | 52.7 | 104.8 | 67.7 |

Figure 3B:
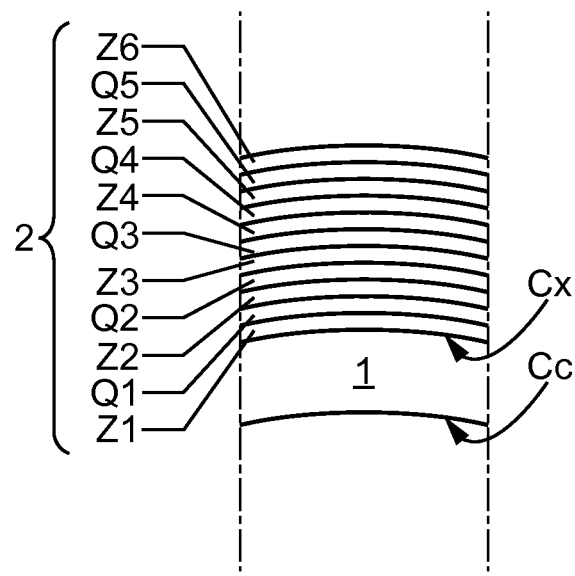

For the tinted glass D7, the visual transmission $T_v$ equals 18.0%, the visual reflection $R_v$ for light impinging onto the concave side Cc with 35° incidence value equals 69.4%, and the medium-blue mean transmittance value $T_{mB}$ equals 50.1%. FIG. 3b shows the layers of such tinted glass D7.

Figure 4A:
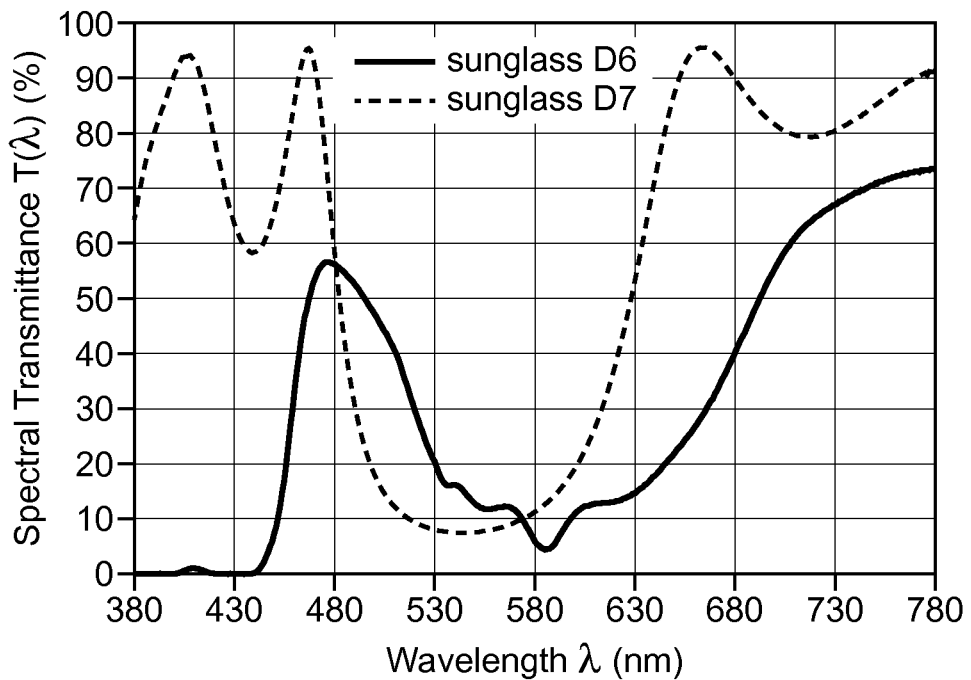
FIGS. 4a and 4b are diagrams displaying spectral transmittance and spectral reflectance curves for both ophthalmic tinted glasses of FIGS. 3a and 3b.
Figure 4B:
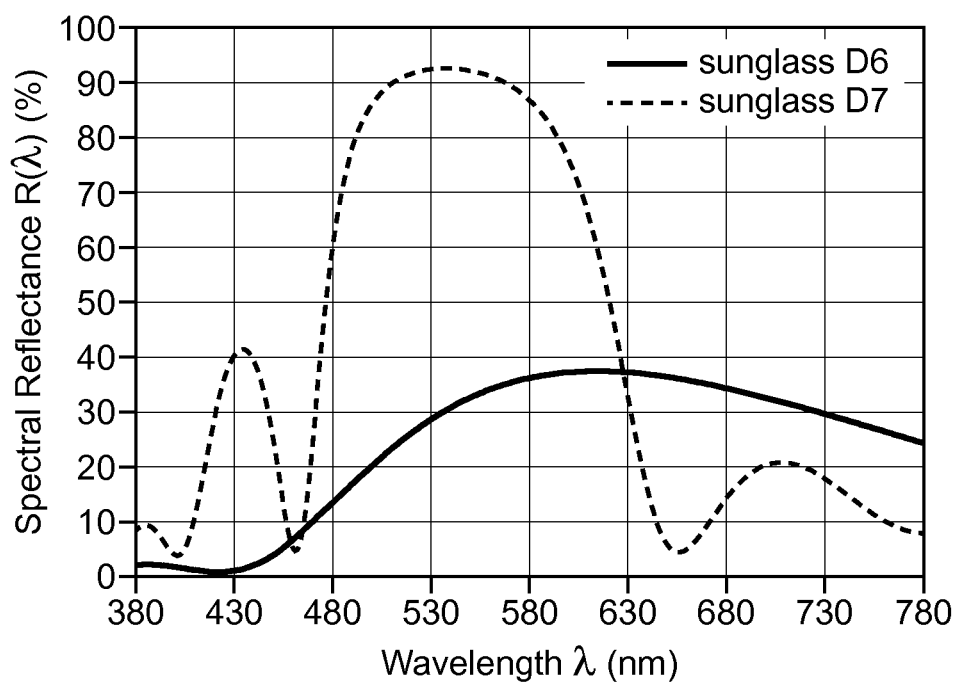

The diagrams of FIGS. 4a and 4b relate to these latter tinted glasses D6 and D7. FIG. 4a exhibits the spectral transmittance curves for both tinted glasses. Spectral transmittance values are noted T(λ) again. For tinted glass D6, one can see the transmittance-lowering effect of the layered structure 2 when compared to the curve of FIG. 2. For tinted glass D7, the large deepening effect between 490 nm and 630 nm is provided by the layered structure 2 of Table 4. FIG. 4b shows the spectral reflectance values R(λ) for light impinging on the convex optical faces Cx with incidence value of 15°. In particular, the spectral reflectance is 37.4% at 610 nm and 13.5% at 480 nm for the tinted glass D6. For the tinted glass D7, the spectral reflectance is 92.5% at 540 nm and 8.8% at 465 nm, again for light impinging on the convex optical faces Cx with incidence value of 15°.

Finally, a last invention embodiment is provided in Table 5 below and FIG. 5. The base eyeglass 1 is that of FIG. 2 and Table 1. Table 5 displays the layer thicknesses in nanometers for both layered structures 2 and 3 of this another tinted glass 10, called Prototype. The actual thickness values may vary again within +/−5% with respect to the values indicated. The layered structure 2 on the convex face Cx has four layers, and is again of selective mirror type. The layered structure 3 on the concave face Cc has six layers, including one of tin oxide ($SnO_2$) which is intermediate between the layers Z3 and Q3, and is antireflective.

TABLE 5 ophthalmic tinted glass Prototype

| 1 | face | Z1 | Q1 | Z2 | Q2 | Z3 | SnO$_2$ | Q3 | T$_v$(%) | T$_{mB}$(%) |
|---|------|------|-------|------|------|-------|------|------|------|------|
| tinted | Cx | 65.5 | 117.4 | 52.4 | 41.4 | none | none | none | 17.9 | 47.8 |
|  | Cc | none | 150.0 | 18.43 | 23.0 | 100.6 | 6.5 | 75.6 | | |

Figure 5:
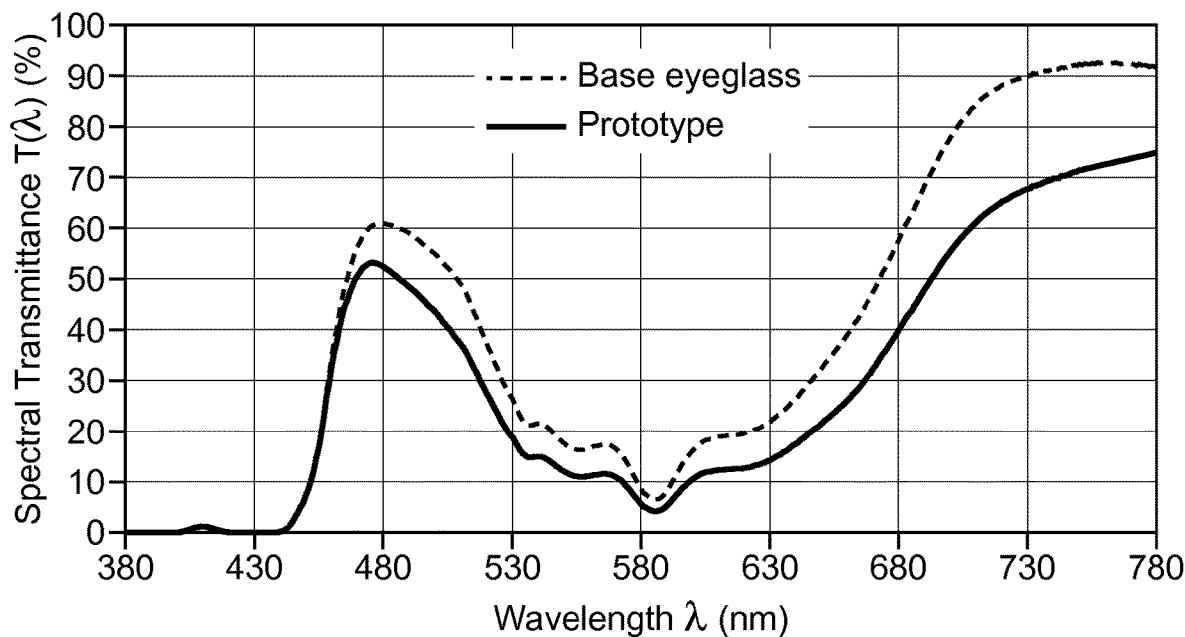
FIG. 5 is diagram displaying a spectral transmittance curve for another ophthalmic tinted glass according to the invention.

The diagram of FIG. 5 compares the spectral transmittance curve of the base eyeglass 1 as used for the tinted glass Prototype, but devoid of the layered structures 2 and 3, and that of the completed tinted glass Prototype. Actually, the spectral transmittance values are modified in a limited extent when the layered structure 3 is suppressed from the tinted glass Prototype. Put another way, a tinted glass which would be comprised only of the tinted base eyeglass 1 according to Table 1 and FIG. 2 and the layered structure 2 according to the Cx-line of Table 5, almost meets the invention. In particular, such tinted glass Prototype devoid of the layered structure 3 on its concave face Cc has the following values: T$_v$=17.4% and T$_{mB}$=46.3%. The antireflective layered structure 3 as implemented in the tinted glass Prototype mainly has the function of reducing the reflection for light rays which impinge laterally from behind the wearer's head onto the concave face Cc of the tinted glass. In addition, antireflective layered structure 3 shows a very low reflection of light in Ultra-violet range, yielding a Ruv lower than 3%, where Ruv is the mean reflection factor between 280 nm and 380 nm, weighted by the function W(λ) defined in the ISO 13666:1998 standard.

Alternatively, the layered structure 2 as displayed in the Cx-line of Table 5 may be combined with many base eyeglasses of different types. In particular, it may be applied on the convex face of a Trivex™-based clear base eyeglass 1. Then, the following values are obtained without implementing any layered structure 3 on the concave face Cc: T$_v$=63.6% and T$_{mB}$=77.7%.

Figure 6:
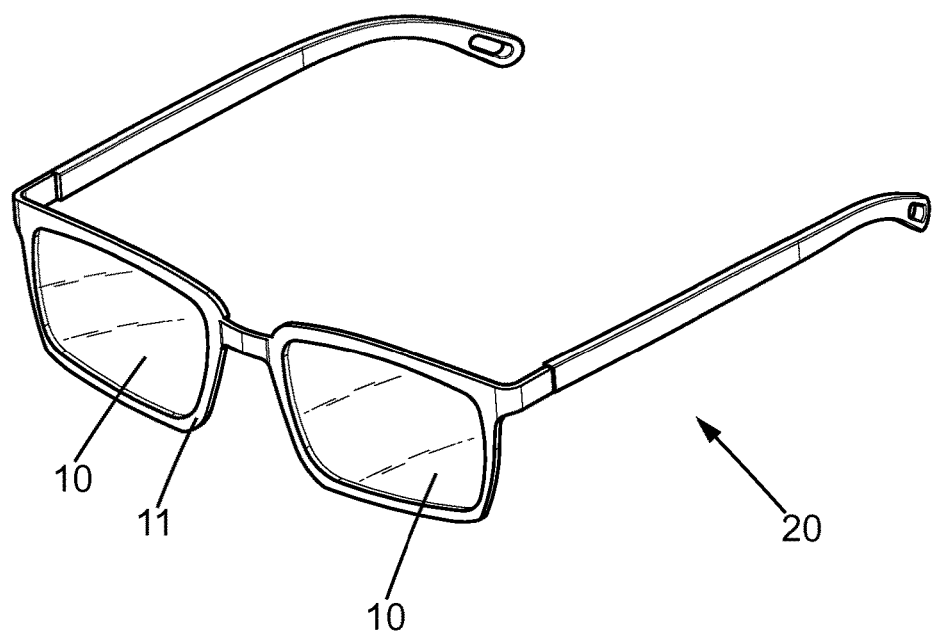
FIG. 6 shows a solar-protection eyewear according to the invention.

In FIG. 6, the solar-protection eyewear 20 comprises two tinted glasses 10 each according to the invention, which are mounted in a frame 11 so as to fit on the wearer's face. Thanks to the invention, the eyewear 20 provides efficient solar protection to the wearer, while avoiding biological, hormonal and behavioural disorders for him.

Inventors have also found that in addition to the first technical feature on the difference which has to be higher than 14%, a second technical feature is that the tinted glass should have the highest possible transmittance in the range of wavelength from 465 nm to 495 nm and a low luminous transmittance Tv in the wavelength in the visible range, ie from 380 nm to 780 nm. Tinted glasses which fulfill this second technical feature comprise a mirror with reflection over the whole spectrum except within the wavelength range 465 nm to 495 nm, where transmittance is high.

To simplify the description, the light within the range of wavelength from 465 nm to 495 nm is named hereafter narrow medium blue and is referenced mB2. The mean transmittance value over the narrow medium-blue range, ie from 465 nm to 495 nm, is obtained from $T_{mB2}=\int_{465\,nm}^{495\,nm} T(\lambda)\cdot d\lambda/30$.

As luminous transmittance Tv shall be low (but not zero as lenses shall transmit some light anyway) whereas T$_{mB2}$ is as high as possible (up to 100%), the ratio Tv/T$_{mB2}$ shows a good measurement of improvement of medium-blue light transmission. For instance, for a flat transmittance (constant transmittance for all wavelengths from 380 nm to 780 nm) Tv/T$_{mB2}$ equals 1. According to invention, Tv/T$_{mB2}$ is smaller than 0.86, preferably smaller than 0.60, more preferably smaller than 0.5, even more preferably lower than 0.4.

Examples of different configurations of tinted glasses which fulfill the first and the second technical features will be described hereafter.

Table 6 below gives the performances of four examples D8, D9, D10, D11 of an ophthalmic tinted glass according to a third configuration of the present invention.

TABLE 6

| Name | T$_v$ (%) | T$_{mB2}$ (%) | T$_v$/T$_{mB2}$ | T$_{mB2}$ - T$_v$ (%) |
|------|-----------|---------------|-----------------|-----------------------|
| D 8 | 30 | 97.5 | 0.31 | 67.5 |
| D 9 | 40.5 | 97.5 | 0.42 | 57 |
| D 10 | 28.9 | 99.75 | 0.29 | 70.9 |
| D 11 | 16 | 97.5 | 0.16 | 81.5 |

Figure 7:
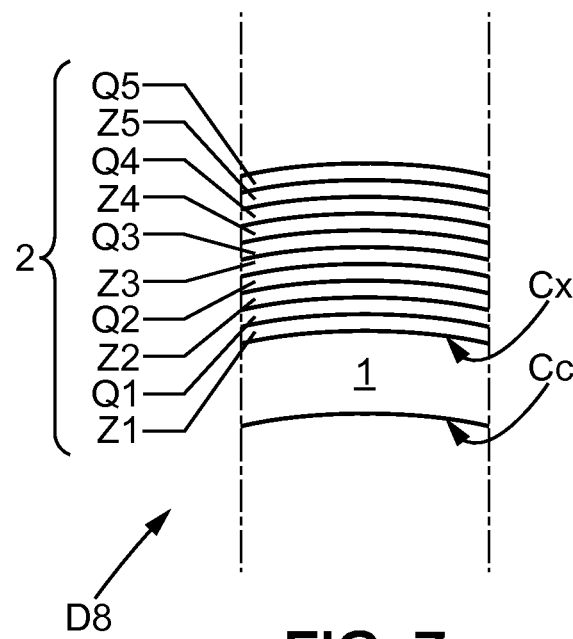
FIG. 7 is part of cross-sectional view of one ophthalmic tinted glass according to a first example of a third configuration of the invention.

A first example D8 of the third configuration of the ophthalmic tinted eyeglass of the invention is represented on FIG. 7 and table 7. It comprises a clear eyeglass 1. The optical convex face Cx of the clear eyeglass 1 is covered by a first interferential layered structure 2. References Z1, Q1, Z2, Q2, Z3,Q4, Z5, Q5,Z6 and Q6 denote the successive layers of the layered structures 2 borne by the optical face Cx of the base eyeglass 1. As visible on FIG. 7, these layers are recited from the base eyeglass 1 to the air interface.

Table 7 displays configurations of examples D8 to D10 of the third configuration of an ophthalmic tinted glass. Lens substrate has a refractive index of 1.6.

TABLE 7

| Name | Z1 | Q1 | Z2 | Q2 | Z3 | Q3 | Z4 | Q4 | Z5 | Q5 | Z6 | Q6 |
|------|----|----|----|----|----|----|----|----|----|----|----|----|
| D 8 | 75.4 | 103.3 | 81.6 | 90.6 | 76.0 | 93.7 | 73.2 | 94.4 | 88.8 | 172.4 | | |
| D 9 | 76.3 | 100.6 | 77.1 | 98.6 | 74.0 | 102.5 | 77.0 | 20.7 | | | | |
| D 10 | 80.1 | 103.6 | 82.4 | 94.4 | 78.9 | 96.5 | 70.9 | 89.1 | 77.2 | 98.5 | 102.1 | 151.8 |

Z1, Z2, Z3, Z4, Z5 and Z6 are zirconia (ZrO$_2$) layers and Q1, Q2, Q3, Q4, Q5 and Q6 are silica (SiO$_2$) layers.

As shown on Table 6, the ratio between the luminous transmittance Tv in the wavelength range from 380 nm to 780 nm to the mean transmittance value over the narrow medium-blue range for this the tinted eyeglass of first example D8 is 0.31. The tinted eyeglass D8 has thus low level of transmission of sun wear while allowing the passage of the wavelength which activate the circadian rhythm.

The performances of the second D9 and of the third D10 example of ophthalmic tinted eyeglass of the third configuration are visible in Table 6. The second D9 and the third D10 examples are similar to the first example at the exception that the second example comprises 8 layers and the second example comprises 12 layers. These examples show that the increase of the number of layers increases the ratio $T_v/T_{mB2}$ of the tinted glass.

Figure 8:
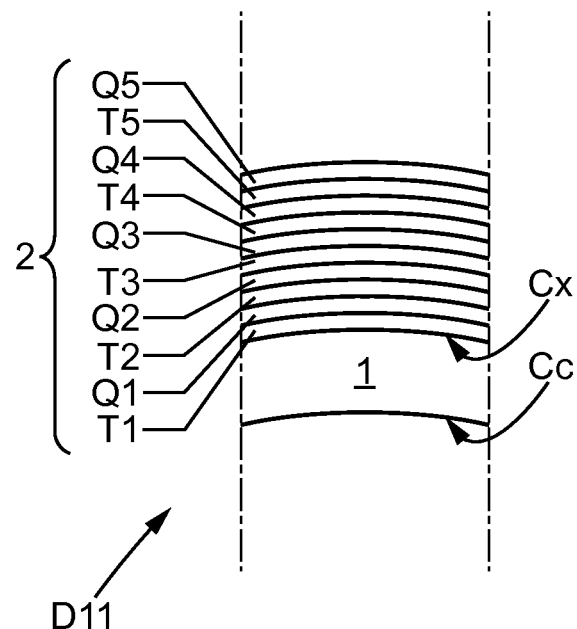
FIG. 8 is part of cross-sectional view of one ophthalmic tinted glass according to a second example of the third configuration of the invention.

A fourth example D11 of the third configuration of an ophthalmic tinted eyeglass of the invention is represented on FIG. 8 and table 8. Lens substrate has a refractive index of 1.6.

TABLE 8

| Name | T1 | Q1 | T2 | Q2 | T3 | Q3 | T4 | Q4 | T5 | Q5 |
|---|---|---|---|---|---|---|---|---|---|---|
| D 11 | 69.1 | 105.6 | 66.8 | 99.7 | 65.0 | 94.9 | 62.1 | 100.1 | 83.3 | 151.5 |

In this table 8, T1, Q1, T2, Q2, T3, Q3, T4, Q4, T5 and Q5 denote the successive layers of the layered structure 2 borne by the optical face Cx of the base eyeglass 1. T1, T2, T3, T4 and T5 are Titanium dioxide ($TiO_2$) layers and Q1, Q2, Q3, Q4 and Q5 are silica ($SiO_2$) layers The ratio between the luminous transmittance Tv in the wavelength range from 380 nm to 780 nm to the mean transmittance value over the narrow medium-blue range for this tinted ophthalmic eyeglass of this fourth example D11 is 0.16. This ratio is very low. This good result is confirmed by FIG. 9 which represents the spectral transmittance curve on the wavelength of 400 nm to 700 nm. On this figure, the spectral transmittance curve for an incidence value of 15° (degree) is represented on solid line and the spectral transmittance curve for an incidence value of 35° (degree) is represented in dotted lined.

Figure 9:
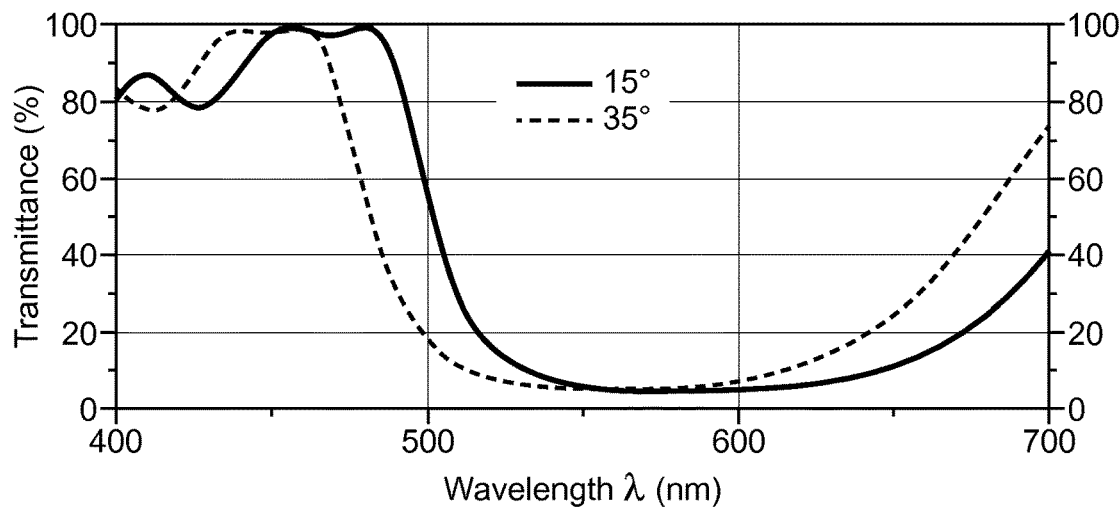
FIG. 9 is a diagram displaying spectral transmittance curves for the ophthalmic tinted glass of FIG. 8.

As visible on FIG. 9, the ophthalmic tinted eyeglass according to this fourth example D11 has a high transmittance value in the range of wavelength from 465 nm to 495 nm and a low transmittance value in the range of wavelengths from 500 nm to 650 nm. This ophthalmic tinted eyeglass according to this fourth example D11 has a level of transmission of class 3. Note that there is a shift of around 20 nm between the spectral transmittance curve for an incidence value of 15° and the spectral transmittance curve for an incidence value of 35°.

According to a fourth configuration of an ophthalmic tinted eyeglass, the tinted eyeglass is covered with interferential layers with an absorbing layer. In this configuration, the optical properties become asymmetric. With such asymmetric layer, one can have different reflection properties on an interferential layered structure if light arrives from one side or from the other side. Here, asymmetry is designed so that light impinging on the lens from front side (or observer side, usually measured for an incident angle of 15°) is reflected whereas light impinging on the lens from back side (or eye side, usually measured with for an incident angle of 35°) is less reflected. In this configuration, the lens behaves like a mirror to reflect light coming from outside (such light would go through the lens to reach wearer's eye). Light coming from back side may be reflected by the front side of the lens towards wearer's eye, which is very unpleasant especially with clear base eyeglass: if amount of light reflected is comparable to amount of light transmitted through lens, wearer will have a blurred vision. Lowering reflection of light coming from back side is then desirable, and can be achieved with interferential layered structure with asymmetric properties. Table 9 gives the performances of two examples D12, D13 of an ophthalmic tinted glass according to this fourth configuration of the present invention.

TABLE 9

| Name | $T_v$ (%) | $T_{mB2}$ (%) | $T_v/T_{mB2}$ | $T_{mB2} - T_v$ (%) |
|---|---|---|---|---|
| D 12 | 37.8 | 66.9 | 0.57 | 29.1 |
| D 13 | 25.2 | 62.1 | 0.41 | 36.9 |

Figure 10:
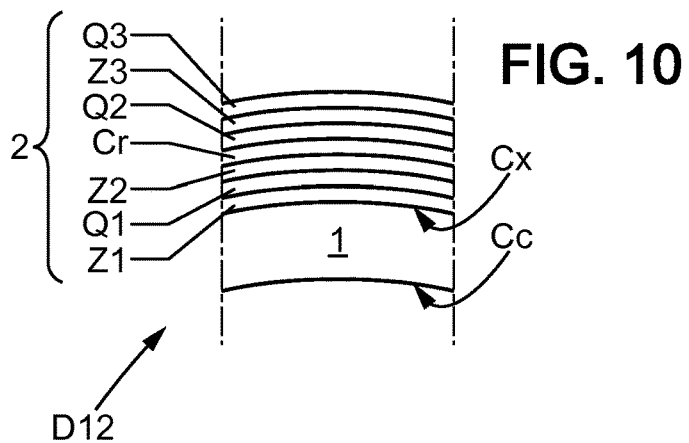
FIG. 10 is part of cross-sectional view of one ophthalmic tinted glass according to a first example of the fourth configuration of the invention.

A first example D12 of this fourth configuration of an ophthalmic tinted eyeglass is represented on FIG. 10 and described in table 10. Lens substrate has a refractive index of 1.60.

TABLE 10

| Name | Z1 | Q1 | Z2 | Cr | Q2 | Z3 | Q3 |
|---|---|---|---|---|---|---|---|
| D 12 | 164.7 | 45.4 | 207.0 | 4.0 | 124.8 | 203 | 7.9 |

In table 10 and on FIG. 10, Z1, Q1, Z2, Cr, Q2 and Z3 denote the successive layers of the layered structures 2 borne by the optical face Cx of the base eyeglass 1. Z1, Z2 and Z3 are zirconia ($ZrO_2$) layers, Cr is chromium and Q1 and Q2 are silica ($SiO_2$) layers.

Figure 11:
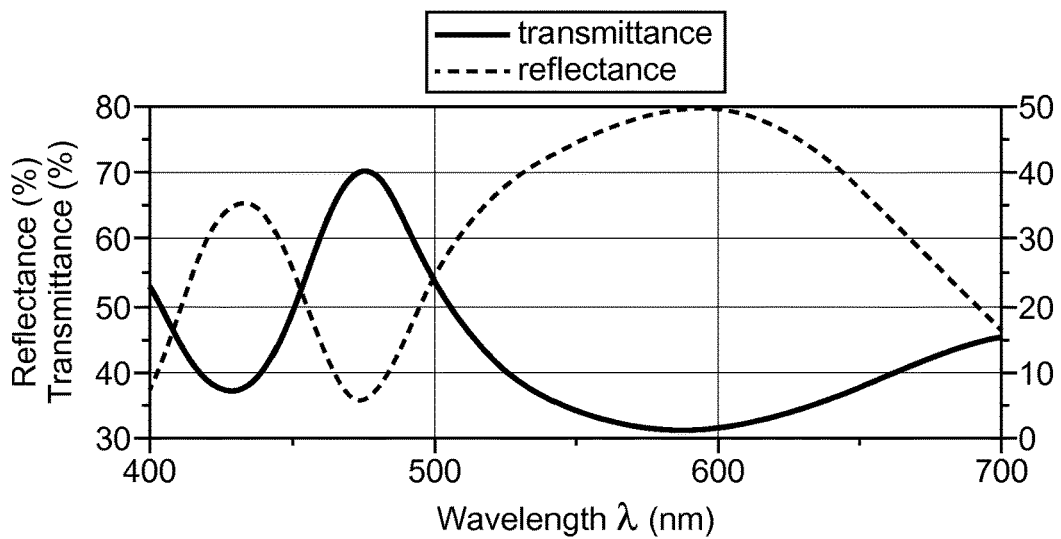
FIG. 11 is a diagram displaying a spectral transmittance curve and a spectral reflectance curve for the ophthalmic tinted glass of FIG. 10.

The ratio between the luminous transmittance Tv in the wavelength range from 380 nm to 780 nm to the mean transmittance value over the narrow medium-blue range for this example D12 of tinted ophthalmic eyeglass is 0.57. FIG. 11 shows in solid line the transmittance and in dotted line the reflectance of the first example D12 of tinted ophthalmic eyeglass. The transmittance of this example D12 is above 50% in the wavelength range from 450 nm to 510 nm.

This example D12 of the fourth configuration of ophthalmic tinted eyeglass has a back reflectance of 1.7% and a back reflectance of 3.7% for incidence angle of 35°, a transmittance of 69.5% at a wavelength of 480 nm, and a luminous transmittance Tv in the wavelength range from 380 nm to 780 nm of 37.8%.

Figure 12:
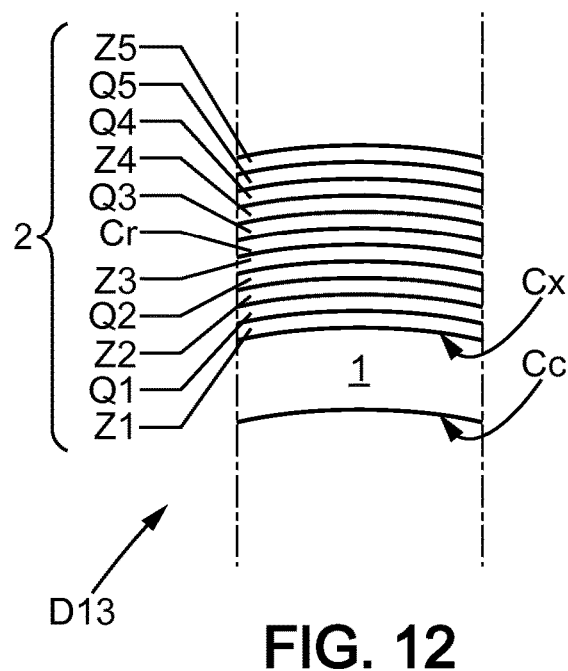
FIG. 12 is part of cross-sectional view of one ophthalmic tinted glass according to a second example of the fourth configuration of the invention.
Figure 13:
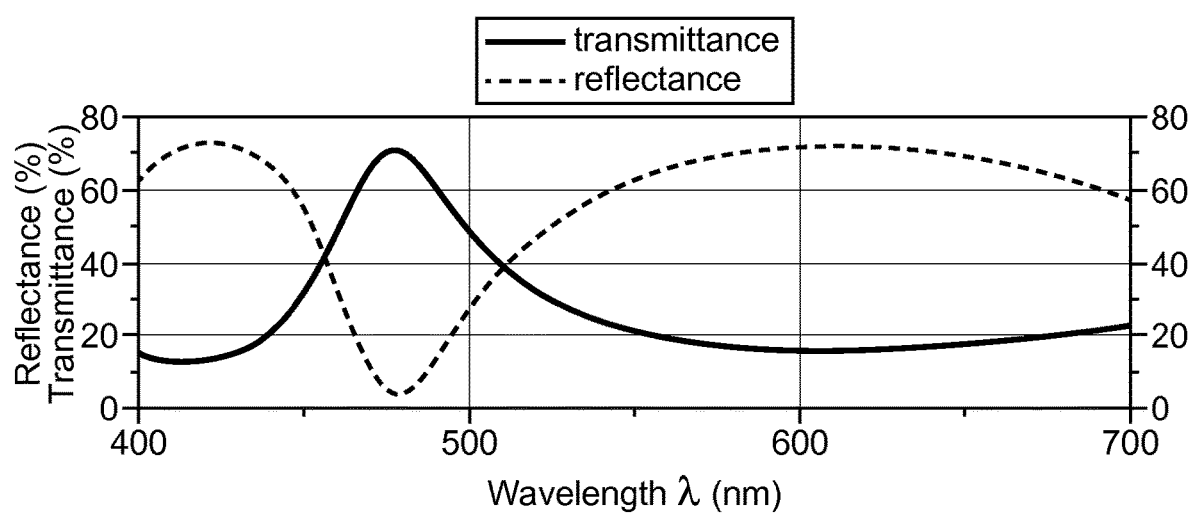
FIG. 13 is a diagram displaying a spectral transmittance curve and a spectral reflectance curve for the ophthalmic tinted glass of FIG. 12.

A second example D13 of the fourth configuration is represented on FIGS. 12 and 13 and described in table 11. Lens substrate has a refractive index of 1.6.

In this example, Z1, Z2, Z3, Z4 and Z5 are zirconia ($ZrO_2$) layers, Cr is chromium and Q1, Q2, Q3 and Q4 are silica ($SiO_2$) layers.

TABLE 11

| Name | Z1 | Q1 | Z2 | Q2 | Z3 | Cr | Q3 | Z4 | Q4 | Z5 |
|------|-----|------|------|-----|------|-----|------|-------|------|------|
| D13 | 171 | 59.8 | 43.0 | 461 | 86.3 | 5.6 | 99.4 | 103.1 | 86.2 | 63.7 |

The transmittance of this example D13 is above 50% in the wavelength range from 460 nm to 490 nm as shown on FIG. 13.

This example D13 of ophthalmic eyeglass has a back reflectance of 1.2% and a back reflectance of 3.5% for incidence angle of 35°, a transmittance of 70% at a wavelength of 480 nm and a luminous transmittance Tv in the wavelength range from 380 nm to 780 nm of 25%.

With both examples D12 and D13, back reflectance has been lowered to limit reflection of light coming from back side into wearer's eyes.

According to a fifth configuration of an ophthalmic tinted eyeglass, the first layered structure 2 comprises one or several Perrot-Fabry type cavity deposited on a lens substrate.

A first metal layer A1 is deposited on the lens substrate. An insulator layer T1 is then applied and on the metal layer A1. A new metal layer A2 is deposited on the insulator layer T1. The succession of these three layers forms a cavity. The radiations are successively partially reflected by each metal layer inside the insulator layer. A part of each radiation comes out at each reflection. An insulator layer is placed on the last metal layer before the air to compensate phase shift and to act as anti-reflective layer for the center wavelength.

The metal layer can for example comprise Silver (Ag), Gold (Au), Copper (Cu), Aluminium (Al) and Chrome. The insulator layer or a dielectric layer can for example comprise Silica ($SiO_2$), Silicon nitride ($Si_3N_4$), Aluminium Oxide ($Al_3O_2$), Titanium Dioxide ($TiO_2$), Zinc Sulfide (ZnS).

Table 12 gives the performance for three examples D14, D15, D16 of tinted glass according to the fifth configuration. Lens substrate is made of polycarbonate having a refractive index of 1.59.

TABLE 12

| Name | $T_v$ (%) | $T_{mB}$ (%) | $T_v/T_{mB}$ | $T_{mB} - T_v$ (%) |
|------|-----------|--------------|--------------|---------------------|
| D 14 | 36.1 | 75.1 | 0.48 | 39 |
| D 15 | 25.5 | 75.3 | 0.34 | 49.8 |
| D 16 | 32.2 | 74.7 | 0.43 | 45.5 |

Figure 14:
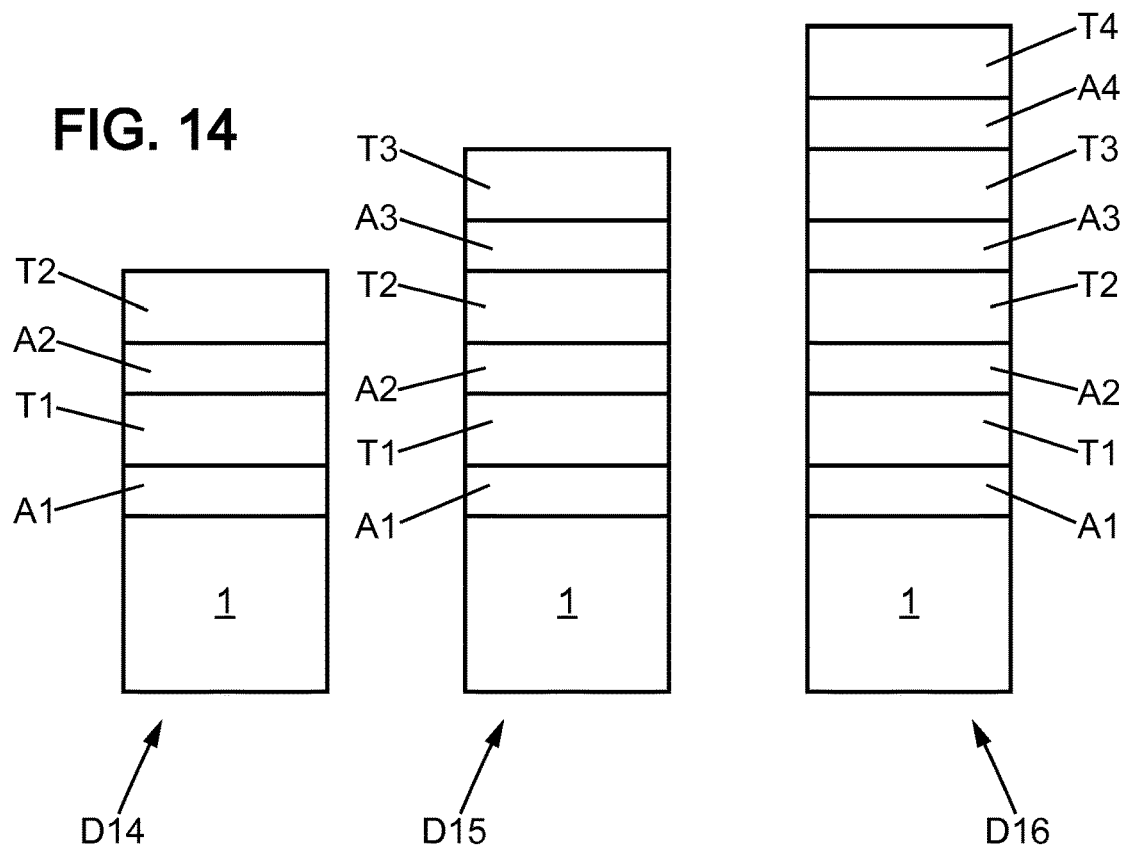
FIG. 14 is a cross-sectional view of the first layered structure borne by the convex optical face of the base eyeglass of the ophthalmic tinted glass according to three examples of a fifth configuration of the invention.

FIG. 14 represents the first layered structure 2 of three examples of an ophthalmic tinted eyeglass of the fifth configuration. As visible on this Figure, the first layered structure 2 of example D14 contains one cavity i.e. one stack of metal-insulator-metal layers. The first layered structure 2 of example D15 contains two cavities i.e. two stacks of metal-insulator-metal layers. The first layered structure 2 of example D16 contains three cavities i.e. three stacks of metal-insulator-metal layers.

For these examples, Titanium Dioxide ($TiO_2$) has been chosen for the insulator layer. Advantageously, this material has a high refractive index. This material possesses further good optical performance in the visible. For these examples, Silver (Ag) has been chosen because the balance between absorption and reflection is good. If the angle insensitivity wants to be privileged, another metal can be chosen.

Table 13 gives configurations of examples D14, D15 and D16 expressed in nanometers.

TABLE 13

| Name | A1 | T1 | A2 | T2 | A3 | T3 | A4 | T4 |
|------|------|------|------|------|------|------|-----|------|
| D 14 | 25 | 54.5 | 25 | 44.1 | | | | |
| D 15 | 22.4 | 51.9 | 42.7 | 60.8 | 20.2 | 47.4 | | |
| D 16 | 17.7 | 52.8 | 38.1 | 58.4 | 39.9 | 63.3 | 15 | 50.6 |

Figure 15:
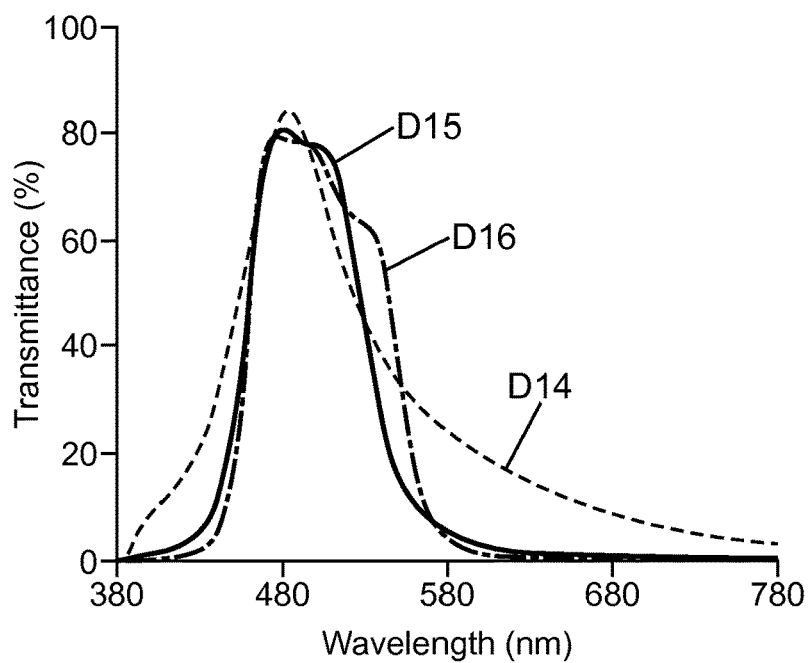
FIG. 15 is a diagram displaying a spectral transmittance curve for the ophthalmic tinted glasses of FIG. 14.

FIG. 15 shows the transmittance of examples D14, D15 and D16 according to the wavelengths. As visible on this figure, the ophthalmic tinted eyeglass of the fifth configuration transmits well the wavelength range of the narrow medium blue and of the wavelength corresponding to the bleu-green color (495 nm-540 nm). The transmittance of example D14 is 83.8% at 480 nm and is 24.2% at 580 nm. The transmittance of example D15 is 80.9% at 480 nm and is 5.2% at 580 nm. The transmittance of example D16 is 79.1% at 480 nm and is 3.9% at 580 nm. The ophthalmic tinted eyeglass of example D15 and D16 are more selective.

Figure 16:
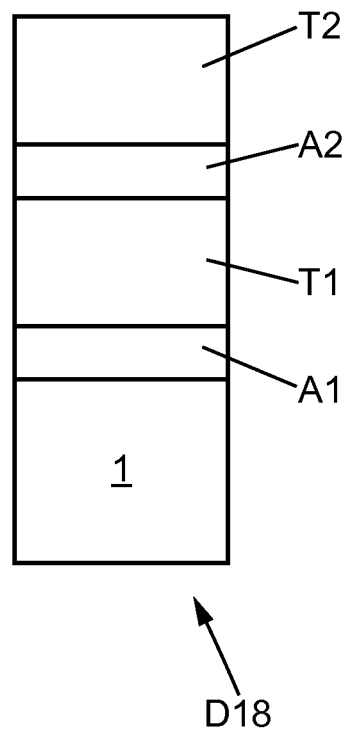
FIG. 16 is a cross-sectional view of the first layered structure borne by the convex optical face of the base eyeglass of the ophthalmic tinted glass according to two other examples of a fifth configuration of the invention.

Table 14 and FIG. 16 illustrate the structure of the first layered structure of another example D18 of an ophthalmic tinted eyeglass according to the fifth configuration. Lens substrate is made of polycarbonate having a refractive index of 1.59.

TABLE 14

| Name | A1 | T1 | A2 | T2 |
|------|------|-------|------|-------|
| D 18 | 25.0 | 153.4 | 25.0 | 135.1 |

Figure 17:
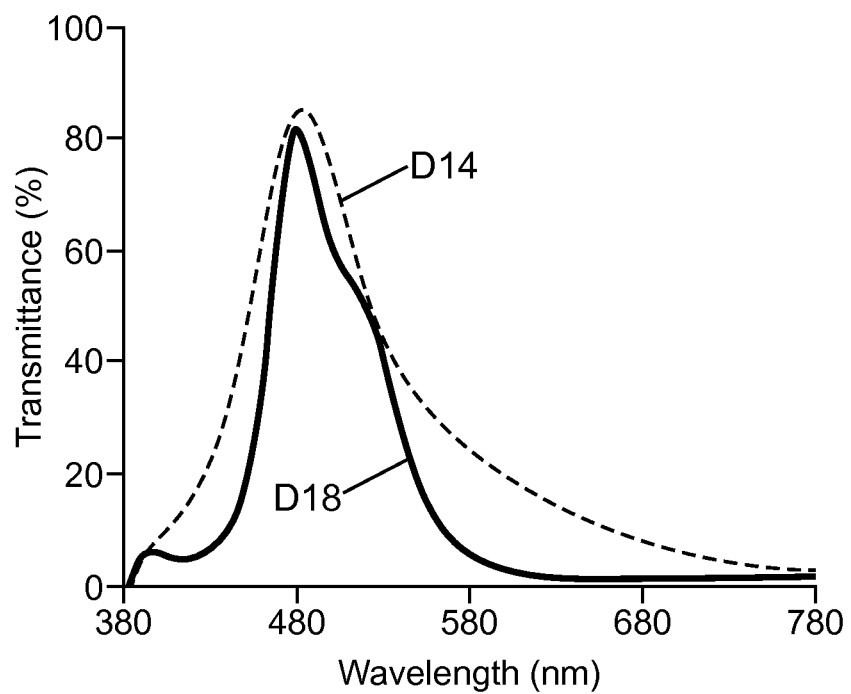
FIG. 17 is a diagram displaying a spectral transmittance curve in the visible for the ophthalmic tinted glasses of FIG. 16.
Figure 18:
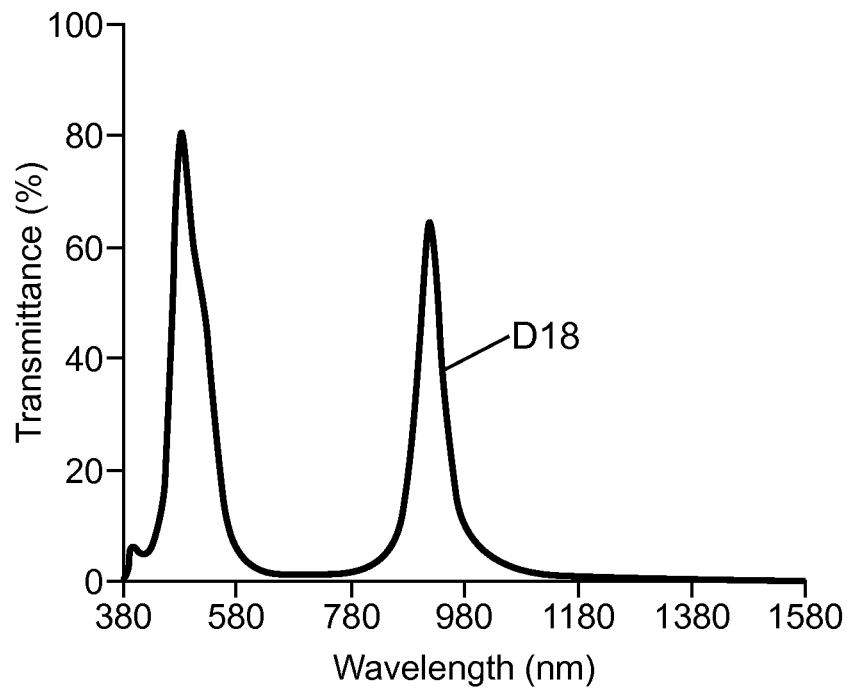
FIG. 18 is a diagram displaying a spectral transmittance curve in the visible and the infrared for one example of the ophthalmic tinted glasses of FIG. 16.

The structure of example D18 is similar to the one of example D14. Thus, example D18 is also made from a succession of Silver (Ag) layer and Titanium Dioxide ($TiO_2$) layer. It comprises one cavity but the insulator layers T1 and T2 of example D18 are thicker. Consequently, the zero-order transmission band of Fabry-Perot cavity is in the infrared light range and the first-order transmission is in the narrow medium blue. FIGS. 17 and 18 show transmittance in the visible range for examples D14 and D18. Example D18 has a higher order of resonance and a narrower bandwidth: It is more selective and allows having lower luminous transmittance Tv than example D14, while having similar $T_{mB2}$. The example D18 has a zero order resonance in the near infrared region.

According to a sixth configuration of an ophthalmic tinted eyeglass, the first layered structure 2 comprise one or several a Multilayered Optical Films (MOF) laminated or glued on a lens substrate.

MOFs are periodic alternated structures of at least two different polymeric materials whose refractive index are different. MOFs generally comprise up to hundreds of layers. By proper choice of refractive index relative thickness of both materials and number of layers, very selective filters can be designed showing well defined interference bandwidth, attenuation of interference band and transmittance values. Details on MOFs can be found in patent EP3112910.

Table 15 gives the performance for three examples D19, D20, D21 of tinted glass according to the sixth configuration of the present invention. Lens substrate is made of polycarbonate having a refractive index of 1.59.

TABLE 15

| Name | $T_v$ (%) | $T_{mB}$ (%) | $T_v/T_{mB}$ | $T_{mB} - T_v$ (%) | $T_{mB2}$ (%) |
|------|-----------|--------------|--------------|---------------------|---------------|
| D 19 | 46.8 | 86.0 | 0.54 | 39.2 | 86.18 |
| D 20 | 49.7 | 89.7 | 0.55 | 40 | 89.79 |
| D 21 | 20.5 | 55.8 | 0.37 | 34.67 | 76.46 |

The example D19 comprises a first organic optical filter F1 having a reflection band B1 and a second optical filter F2 having a second reflection band B2. Both filters are laminated on lens substrate in any order on one side of the lens or both filters are laminated one on each side of the lens.

Figure 19:
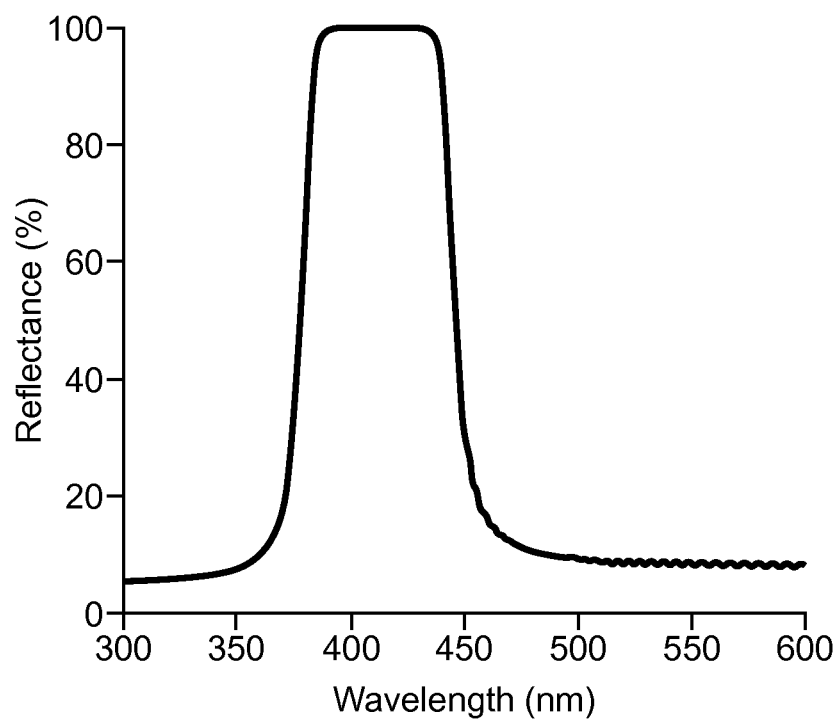
FIG. 19 is a diagram displaying the reflectance for a first optical filter of the ophthalmic tinted glass according to a first example of the sixth configuration of the invention.

The first optical filter F1 is a MOF having a reflection band B1 between 380 nm and 450 nm as shown on FIG. 19. So, the first optical filter F1 is adapted to cut bad blue under 450 nm and to let pass wavelengths above 450 nm. This first filter F1 can for example be made with 123 layers of Polyethylene terephthalate (PET) alternately with 122 layers of Polymethylmethacrylate (PMMA). The optical thickness ratio f of the PET and the PMMA is 0.5. The thickness of the layers is not constant. It varies along a linear gradient profile. The lowest thickness corresponds to a wavelength of 390 nm (blue side). The highest thickness corresponds to a wavelength of 480 nm (red side). The optical thickness of one PET/PMMA bilayer is 195 nm (both materials have an optical thickness of 97.5 nm) for the wavelength of 390 nm. The first order transmission is in the visible and there is no reflection in the infrared region.

Figure 20:
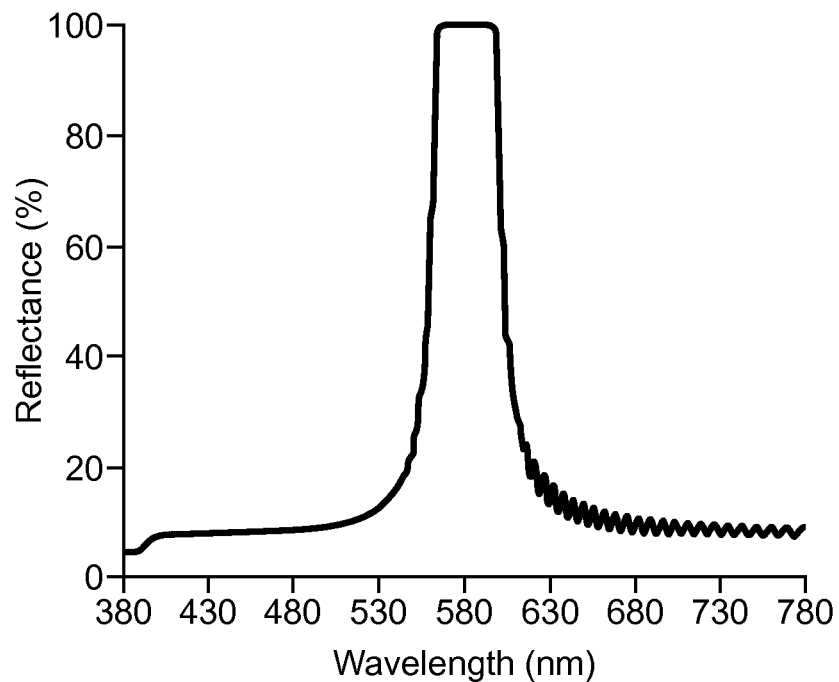
FIG. 20 is a diagram displaying the reflectance for a second optical filter of the ophthalmic tinted glass according to the first example of the sixth configuration of the invention.

The second optical filter F2 is a MOF having a refection band B2 between 565 nm and 595 nm as shown on FIG. 20. So, the second optical filter F2 is adapted to cut wavelengths between 565 nm and 595 nm. This second MOF can for example be made with 123 layers of Polyethylene terephthalate (PET) alternately with 122 layers of Polymethylmethacrylate (PMMA). The optical thickness ratio f of the PET and the PMMA is 0.5. The thickness of the layers is constant. The optical thickness of one PET/PMMA bilayer is 145 nm (both materials have an optical thickness of 72.5 nm) for the wavelength of 290 nm. The first order transmission is in the visible and there is no reflection in the infrared region.

Figure 21:
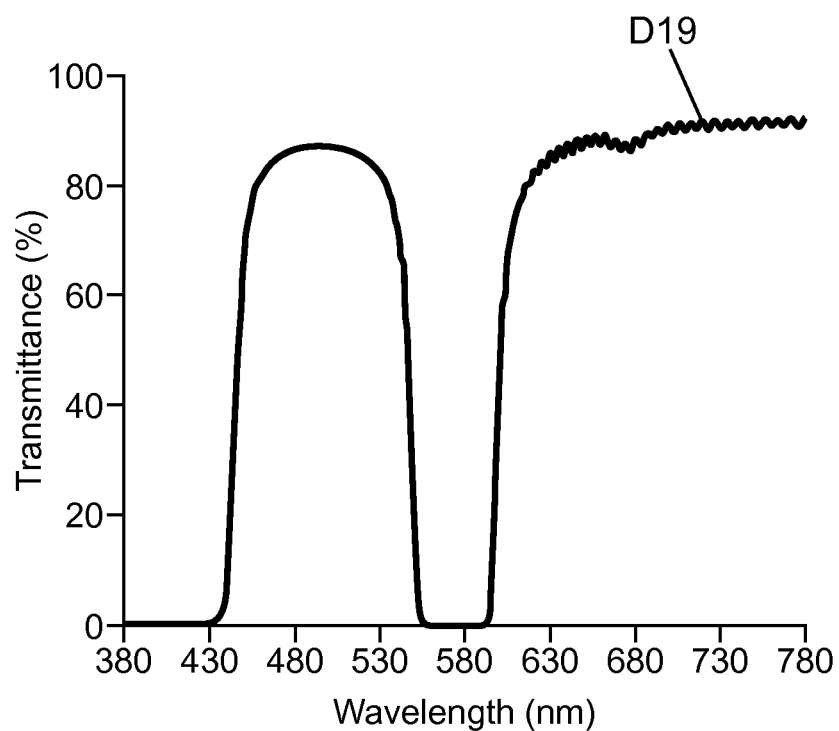
FIG. 21 is a diagram displaying the spectral transmittance curve for the first example of the sixth configuration of the invention.

As visible on FIG. 21, the transmittance of the first example D19 of the sixth embodiment is 83.8% at 480 nm and is 24.2% at 580 nm.

As visible on table 15, the difference of the mean transmittance value of the first example D19 over the medium blue region, minus the luminous transmittance of the first example D19 is equal to 39.2%. The transmittance over a wavelength range from 465 nm to 495 nm is 86.18%.

The second example D20 of the sixth configuration is made with one MOF which use several orders of reflection. This MOF is for example made with 123 layers of Polyethylene terephthalate (PET) alternately with 122 layers of Polymethylmethacrylate (PMMA). The optical thickness ratio f of PET is 0.2. The thickness of the layers vary along a linear gradient profile to create a first order of reflection in the infrared region. The lowest thickness corresponds to a wavelength of 1120 nm (infrared). The highest thickness corresponds to a wavelength of 1550 nm (infrared). The optical thickness of one PET/PMMA bilayer is 560 nm (112 nm for PET and 448 nm for PMMA) for the wavelength of 1120 nm.

Figure 22:
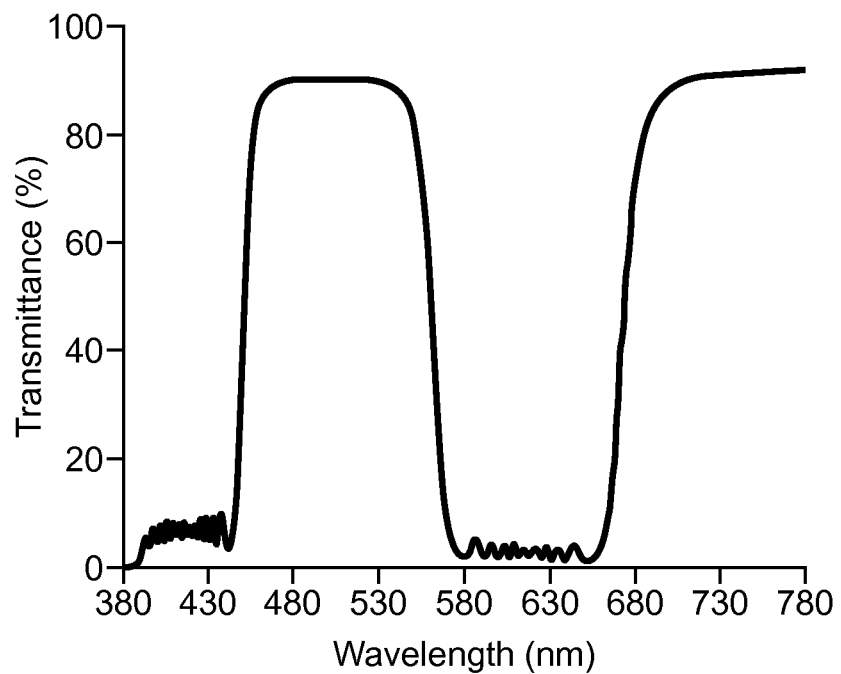
FIG. 22 is a diagram displaying the spectral transmittance curve for a second example of the sixth configuration of the invention.

As visible on FIG. 22, the second order of reflection is used to cut the wavelengths region from 565 nm to 700 nm. The third order of reflection is used to cut the wavelength region under 450 nm (bad blue). The transmittance of the second example D20 is 90% at 480 nm and is 1.9% at 580 nm.

As visible on table 15, the difference of the mean transmittance value of the second example D20 over the medium blue region, minus the luminous transmittance of the second example D20 is equal to 40%. The transmittance over a wavelength range from 465 nm to 495 nm is 89.79%.

The third example D21 comprises a first organic optical filter F10 and a second optical filter F20. Both filters are laminated on lens substrate in any order on one side of the lens or both filters are laminated one on each side of the lens.

Figure 23:
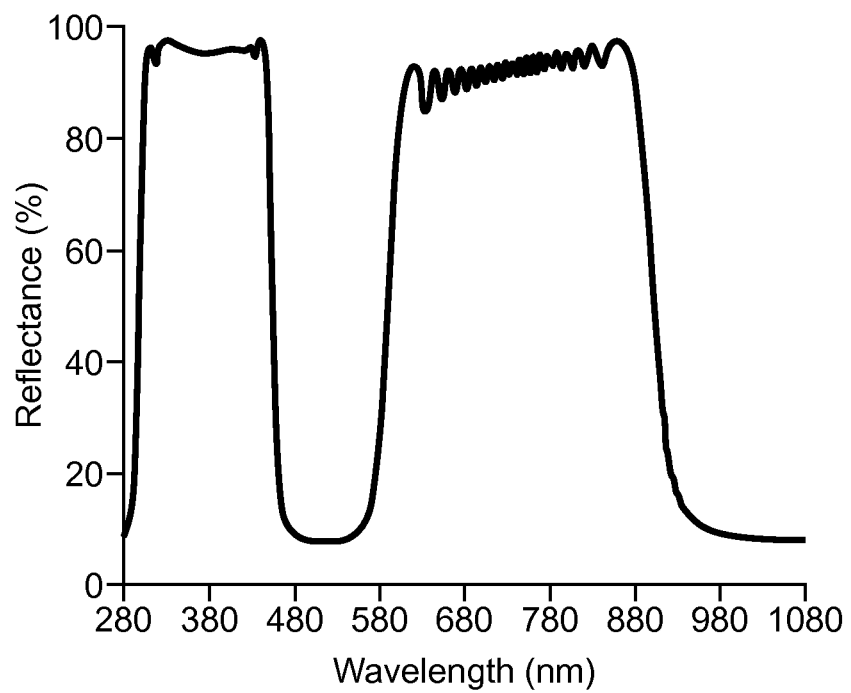
FIG. 23 is a diagram displaying the reflectance for a first optical filter of the ophthalmic tinted glass according to a third example of the sixth configuration of the invention.

The first optical filter F10 is a MOF having a first reflection band B10 between 280 nm and 450 nm and a second reflection band B20 between 590 nm and 900 nm as visible on FIG. 23.

This first filter F10 can for example be made with 250 layers of Polyethylene terephthalate (PET) alternately with 249 layers of Polymethylmethacrylate (PMMA). The optical thickness ratio f of PET is 0.2. The thickness of the layers is not constant. The layers varies along a linear gradient profile to create a first order of reflection in the red and in the infrared region. The lowest thickness corresponds to a wavelength of 590 nm. The highest thickness corresponds to a wavelength of 900 nm. The optical thickness of one PET/PMMA bilayer is 295 nm (59 nm of PET and 236 nm of PMMA) for the wavelength of 590 nm. The second order reflection is in ultra violet and in the bad blue region ie from 280 nm to 450 nm.

Figure 24:
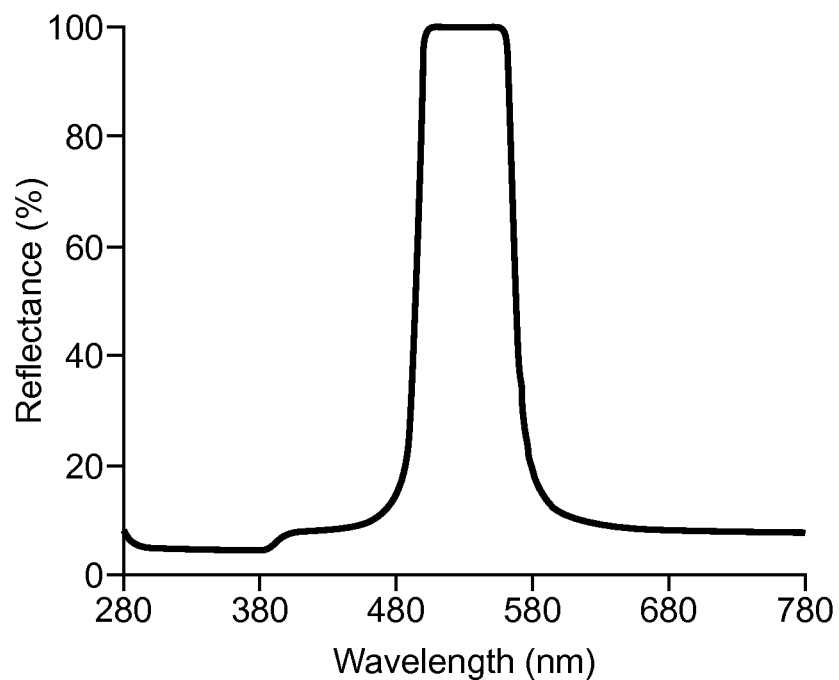
FIG. 24 is a diagram displaying the reflectance for a second optical filter of the ophthalmic tinted glass according to the third example of the sixth configuration of the invention.

The second optical filter F20 is a MOF having a refection band B30 between 510 nm and 550 nm as shown on FIG. 24. This second MOF is made with 250 layers of Polyethylene terephthalate (PET) alternately with 249 layers of Polymethylmethacrylate (PMMA). A linear thickness gradient is created to obtain a first order of reflection in the visible region. The optical thickness ratio f of PET and PMMA is 0.5 at normal incidence. The lowest thickness corresponds to a wavelength of 510 nm. The highest thickness corresponds to a wavelength of 550 nm. The optical thickness of one PET/PMMA bilayer is 255 nm (both materials have an optical thickness of 122.5 nm) for the wavelength of 510 nm.

Figure 25:
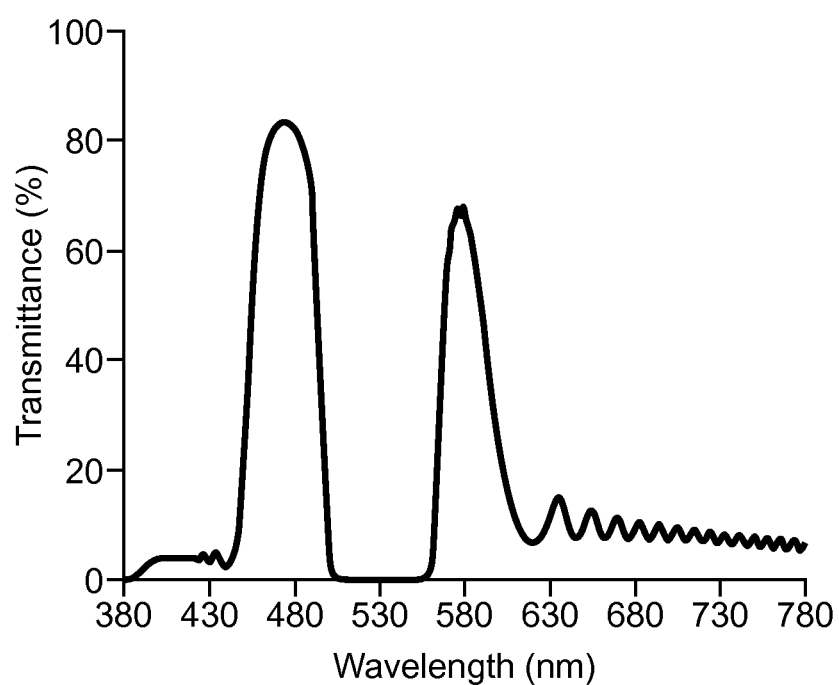
FIG. 25 is a diagram displaying the transmittance for the third example of the sixth configuration of the invention.

A visible on the overall transmittance curve of the third example D21 of the sixth embodiment shown on FIG. 25, the transmittance of example D21 is 82% at 480 nm and is 66% at 580 nm.

As visible on table 15, the difference of the mean transmittance value of the first example D21 over the medium blue region, minus the luminous transmittance of the first example D21 is equal to 34.67%. The transmittance over a wavelength range from 465 nm to 495 nm is 76.46%.

The invention claimed is:
1. An ophthalmic tinted glass comprising:
a substrate-forming base eyeglass, comprised of a self-supporting portion of a light-transmitting material intermediate between a convex face and a concave face, and
a first layered structure covering the convex face of the base eyeglass, and adapted for increasing a reflection effective for light impinging from outside of the tinted glass-onto the convex face covered by the first layered structure, when compared to a reference reflection effective for light impinging also from outside onto the convex face but without the first layered structure, the reflection increase being effective for at least one light wavelength higher than 520 nm, the base eyeglass and the first layered structure being such that a difference equal to a mean transmittance value of the tinted glass over a wavelength range from 460 nm to 510 nm, or from 465 nm to 495 nm, minus a visual transmission value of the tinted glass is higher than 14%, and wherein a spectral reflectance of said ophthalmic tinted glass for light impinging on the convex optical face with incidence value of 15°, has a value of more than 30% for at least one first wavelength comprised between 520 nm and 660 nm, and another value of less than 20% for at least one second wavelength comprised between 460 nm and 510 nm.

2. The ophthalmic tinted glass of claim 1, wherein the base eyeglass and the first layered structure are such that the difference equal to the mean transmittance value over the wavelength range from 460 nm to 510 nm, or from 465 nm to 495 nm, minus the visual transmission value is higher than or equal to 20%.

3. The ophthalmic tinted glass of claim 1, wherein the base eyeglass has a visual transmission value higher than 18% when devoid of the first layered structure, and the first layered structure is such that the visual transmission value of the tinted glass is less than or equal to 18%.

4. The ophthalmic tinted glass of claim 1, wherein the base eyeglass and the first layered structure are such that the mean transmittance value of the tinted glass over the wavelength range from 460 nm to 510 nm, or from 465 nm to 495 nm, is higher than 30%.

5. The ophthalmic tinted glass of claim 1, wherein the base eyeglass is such that a spectral transmittance of said base eyeglass when devoid of the first layered structure, is less than 30% across a wavelength range from 380 nm to 450 nm.

6. The ophthalmic tinted glass of claim 1, wherein the base eyeglass is such that a spectral transmittance of said base eyeglass when devoid of the first layered structure is less than 25% across a wavelength range from 540 nm to 630 nm.

7. The ophthalmic tinted glass of claim 1, wherein the base eyeglass is such that the visual transmission value of said base eyeglass when devoid of the first layered structure is less than 25%.

8. The ophthalmic tinted glass of claim 1, wherein the material of the base eyeglass is comprised of a transparent matrix with dyes and absorbers distributed within the matrix, at least one of said dyes having a light-absorption peak in a wavelength range from 380 nm to 450 nm, and at least two of said absorbers having respective light-absorption peaks in another wavelength range from 520 nm to 660 nm.

9. The ophthalmic tinted glass of claim 1, further comprising:
a second layered structure covering the concave face of the base eyeglass, and adapted for decreasing a visual reflection value effective for light impinging from outside of the tinted glass onto the concave face covered by the second layered structure, when compared to a visual reference reflection effective for light impinging also from outside onto the concave face of the base eyeglass but when devoid of the second layered structure.

10. The ophthalmic tinted glass of claim 9, wherein the second layered structure is such that the visual reflection value effective for light impinging from outside of the tinted glass onto the concave face covered by said second layered structure is less than 3% for incidence value of 35°.

11. The ophthalmic tinted glass of claim 1, wherein the first layered structure is a stack of eleven layers alternatively of zirconia and silica, starting and ending with two of said zirconia layers, with the zirconia layers having respective thicknesses between 50 nm and 73 nm, and the silica layers having respective thicknesses between 80 nm and 125 nm.

12. The ophthalmic tinted glass of claim 9, wherein the first layered structure is an ordered stack comprising, from the convex face of the base eyeglass:
an underlayer with a refractive index of about 1.5 for wavelength value of 633 nm, and with a thickness of between 65 nm and 80 nm,
three layers alternatively of zirconia and silica, starting with a first zirconia layer having a thickness of between 90 nm and 100 nm, then a first silica layer having a thickness of between 59 nm and 65 nm, and then a second zirconia layer having a thickness of between 74 nm and 82 nm,
one indium-tin oxide layer having a thickness of between 5 nm and 8 nm, and
a second silica layer having a thickness of between 28 nm and 32 nm;
and wherein the second layered structure is an ordered stack comprising, from the concave face of the base eyeglass:
another underlayer with a refractive index of about 1.5 for wavelength value of 633 nm, and with a thickness of between 143 nm and 158 nm,
another three layers alternatively of zirconia and silica, starting with another first zirconia layer having a thickness of between 18 nm and 20 nm, then another first silica layer-having a thickness of between 32 nm and 36 nm, and then another second zirconia layer having a thickness of between 70 nm and 78 nm,
another indium-tin oxide layer having a thickness of between 5 nm and 8 nm, and
another second silica layer having a thickness of between 95 nm and 104 nm.

13. The ophthalmic tinted glass of claim 1, wherein the transmittance over a wavelength range from 465 nm to 495 nm is higher than 60%.

14. The ophthalmic tinted glass of claim 1, wherein the transmittance over a wavelength range from 465 nm to 495 nm is higher than 75%.

15. The ophthalmic tinted glass of claim 1, wherein the base eyeglass is a clear eyeglass.

16. Solar-protection eyewear, comprising a frame and two ophthalmic tinted glasses mounted into the frame, each ophthalmic tinted glass comprising:
a substrate-forming base eyeglass, comprised of a self-supporting portion of a light-transmitting material intermediate between a convex face and a concave face; and
a first layered structure covering the convex face of the base eyeglass, and adapted for increasing a reflection effective for light impinging from outside of the tinted glass onto the convex face covered by the first layered structure, when compared to a reference reflection effective for light impinging also from outside onto the convex face but without the first layered structure, the reflection increase being effective for at least one light wavelength higher than 520 nm,
the base eyeglass and the first layered structure being such that a difference equal to a mean transmittance value of the tinted glass over a wavelength range from 460 nm to 510 nm, or from 465 nm to 495 nm, minus a visual transmission value of the tinted glass is higher than 14%, and wherein a spectral reflectance of said ophthalmic tinted glass for light impinging on the convex optical face with incidence value of 15°, has a value of more than 30% for at least one first wavelength comprised between 520 nm and 660 nm, and another value of less than 20% for at least one second wavelength comprised between 460 nm and 510 nm.

17. An ophthalmic tinted glass comprising:
a substrate-forming base eyeglass, comprised of a self-supporting portion of a light-transmitting material intermediate between a convex face and a concave face, and
a first layered structure covering the convex face of the base eyeglass, and adapted for increasing a reflection effective for light impinging from outside of the tinted glass-onto the convex face covered by the first layered structure, when compared to a reference reflection effective for light impinging also from outside onto the convex face but without the first layered structure, the reflection increase being effective for at least one light wavelength higher than 520 nm,
the base eyeglass and the first layered structure being such that a difference equal to a mean transmittance value of the tinted glass over a wavelength range from 460 nm to 510 nm, or from 465 nm to 495 nm, minus a visual transmission value of the tinted glass is higher than 14%, wherein the first layered structure is a stack of eleven layers alternatively of zirconia and silica, starting and ending with two of said zirconia layers, with the zirconia layers having respective thicknesses between 50 nm and 73 nm, and the silica layers having respective thicknesses between 80 nm and 125 nm.

18. The ophthalmic tinted glass of claim 4, wherein the base eyeglass and the first layered structure are such that the mean transmittance value of the tinted glass over the wavelength range from 460 nm to 510 nm, or from 465 nm to 495 nm, is higher than 40%.

19. The ophthalmic tinted glass of claim 18, wherein the base eyeglass and the first layered structure are such that the mean transmittance value of the tinted glass over the wavelength range from 460 nm to 510 nm, or from 465 nm to 495 nm, is higher than or equal to 48%.

20. The ophthalmic tinted glass of claim 5, wherein the base eyeglass is such that a spectral transmittance of said base eyeglass when devoid of the first layered structure is less than 20% across a wavelength range from 380 nm to 450 nm.

21. The ophthalmic tinted glass of claim 10, wherein the second layered structure is such that the visual reflection value effective for light impinging from outside of the tinted glass onto the concave face covered by said second layered structure is less than 2.5% for incidence value of 35°.

* * * * *